(12) United States Patent
Richards, Jr.

(10) Patent No.: US 10,539,073 B2
(45) Date of Patent: Jan. 21, 2020

(54) CENTRIFUGAL GAS COMPRESSOR

(71) Applicant: Chester L Richards, Jr., Thousand Oaks, CA (US)

(72) Inventor: Chester L Richards, Jr., Thousand Oaks, CA (US)

( * ) Notice: Subject to any disclaimer, the term of this patent is extended or adjusted under 35 U.S.C. 154(b) by 362 days.

(21) Appl. No.: 15/530,910

(22) Filed: Mar. 20, 2017

(65) Prior Publication Data

US 2018/0266318 A1 Sep. 20, 2018

(51) Int. Cl.
| | |
|---|---|
| *F02C 3/10* | (2006.01) |
| *F02C 7/04* | (2006.01) |
| *F02K 7/08* | (2006.01) |
| *F04F 5/00* | (2006.01) |
| *F04F 5/18* | (2006.01) |

(52) U.S. Cl.
CPC ............... *F02C 7/04* (2013.01); *F02C 3/103* (2013.01); *F02K 7/08* (2013.01); *F04F 5/00* (2013.01); *F04F 5/18* (2013.01)

(58) Field of Classification Search
CPC .... F02C 3/103; F02C 3/05; F02C 3/08; F02C 3/09; F02K 7/10; F02K 7/14; B64D 2033/026; F04D 1/00; F04D 1/04; F04D 27/023; F04D 27/0238; F04F 5/00; F04F 5/18

See application file for complete search history.

(56) References Cited

U.S. PATENT DOCUMENTS

| | | | |
|---|---|---|---|
| 2,374,671 A | 5/1945 | Dupont | |
| 2,380,772 A | 7/1945 | McMahan | |
| 2,477,683 A | 8/1949 | Birmann | |
| 2,607,191 A | 8/1952 | Lee | |
| 2,639,580 A | 5/1953 | Stuart | |
| 2,920,448 A | 1/1960 | Coanda | |
| 2,938,658 A | 5/1960 | Foster | |
| 2,981,065 A | 4/1961 | Sloan | |
| 3,055,178 A | 9/1962 | Phillips | |

(Continued)

FOREIGN PATENT DOCUMENTS

| | | |
|---|---|---|
| GB | 696757 A | 9/1953 |
| GB | 730573 A | 5/1955 |

(Continued)

*Primary Examiner* — Gerald L Sung
*Assistant Examiner* — Alyson Joan Harrington
(74) *Attorney, Agent, or Firm* — Tom Streeter

(57) ABSTRACT

This invention performs the gas pressurization task of a centrifugal compressor gas turbine engine in a new way. In this invention gas compression takes place by using pinwheel-like thrusters to induce a very high velocity full forced vortex in the gas being compressed. Much higher "tip" velocities can be achieved because no strength-limited solid centrifugal impeller is required to spin up the gas. Due to the consequent very high vortex velocity a single stage pressure ratio of twenty five to one, or more, may be possible. Because there is no high pressure turbine, the gas pressure delivered to some downstream useful work device is much higher than is the case with conventional gas turbine engines. The invention's compressor requires no major moving parts except for the gas flow. The consequence is that the invention is predicted to have substantially better performance and general characteristics than conventional gas turbine engines.

5 Claims, 11 Drawing Sheets

Sectional Front View

Sectional Side View

(56) References Cited

U.S. PATENT DOCUMENTS

| | | | |
|---|---|---|---|
| 3,077,075 A | 2/1963 | Turanciol | |
| 3,208,229 A | 9/1965 | Fulton | |
| 3,369,737 A | 2/1968 | Switzer | |
| 3,371,718 A | 3/1968 | Bacon | |
| 3,382,679 A | 5/1968 | Spoerlein | |
| 3,501,014 A | 3/1970 | Fitch | |
| 3,680,317 A * | 8/1972 | Kotoc | F01K 25/00 60/269 |
| 3,699,771 A | 10/1972 | Chelminski | |
| 3,774,398 A | 11/1973 | Etessam | |
| 3,808,802 A | 5/1974 | Tanasawa | |
| 3,925,981 A | 12/1975 | Etessam | |
| 3,927,958 A | 12/1975 | Quinn | |
| 4,051,671 A | 10/1977 | Brewer | |
| 4,085,585 A | 4/1978 | Sharpe | |
| 4,118,929 A | 10/1978 | Sharpe | |
| 4,428,191 A | 1/1984 | Lane | |
| 4,459,101 A | 7/1984 | Doherty | |
| 4,592,202 A | 6/1986 | Stewart | |
| 4,689,950 A | 9/1987 | Minardi | |
| 4,756,154 A | 7/1988 | Minardi | |
| 5,165,226 A | 11/1992 | Newton | |
| 5,311,907 A | 5/1994 | Houck | |
| 5,417,057 A | 5/1995 | Robey | |
| 5,660,038 A | 8/1997 | Stone | |
| 6,216,446 B1 | 4/2001 | Stram | |
| 6,457,305 B1 | 10/2002 | Schierbaum | |
| 6,981,366 B2 | 1/2006 | Sharpe | |
| 7,784,267 B2 | 8/2010 | Tobita | |
| 7,954,329 B2 | 6/2011 | Grossi | |
| 8,250,854 B2 | 8/2012 | Sharpe | |
| 8,596,035 B2 | 12/2013 | Mowill | |
| 8,689,561 B2 | 4/2014 | Kendrick | |
| 9,021,784 B1 | 5/2015 | Sharpe | |
| 2005/0081508 A1 | 4/2005 | Edelman | |
| 2007/0065274 A1 | 3/2007 | Birrell | |
| 2008/0240904 A1 * | 10/2008 | Schlote | F04D 1/00 415/89 |
| 2009/0238677 A1 * | 9/2009 | Clemen | F04D 27/0238 415/52.1 |
| 2011/0083420 A1 | 4/2011 | Clay | |
| 2014/0224940 A1 | 8/2014 | Rybalko | |
| 2014/0290259 A1 | 10/2014 | Plante | |
| 2016/0047324 A1 | 2/2016 | Kemmerling | |
| 2016/0281722 A1 | 9/2016 | Roberts | |

FOREIGN PATENT DOCUMENTS

| | | |
|---|---|---|
| GB | 872600 A | 7/1961 |
| GB | 1301968 A | 1/1973 |
| WO | WO2005008043 A2 | 1/2005 |
| WO | WO2013141912 A2 | 9/2013 |

* cited by examiner

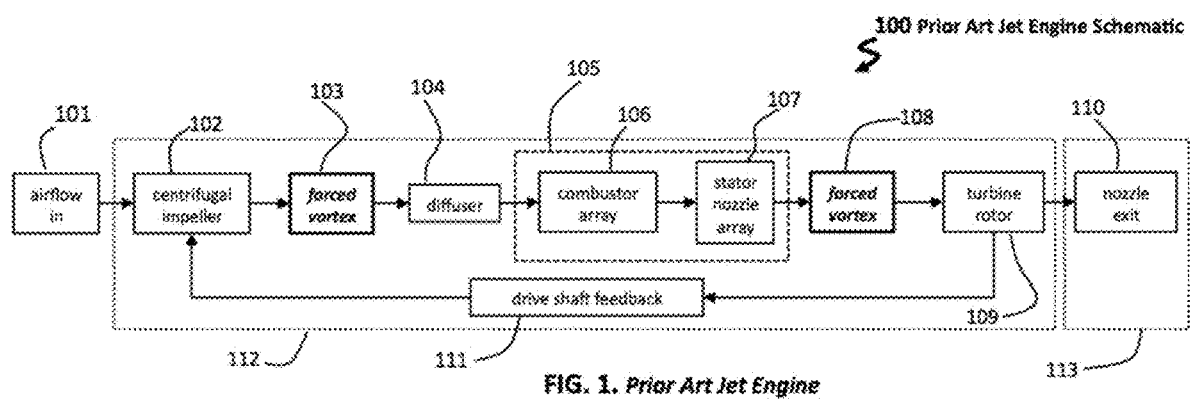
FIG. 1. Prior Art Jet Engine
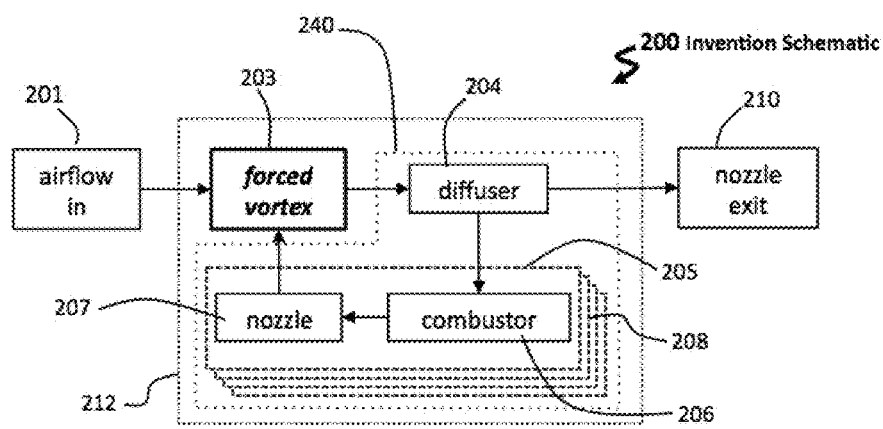
FIG. 2. Invention Embodiment as Jet Engine

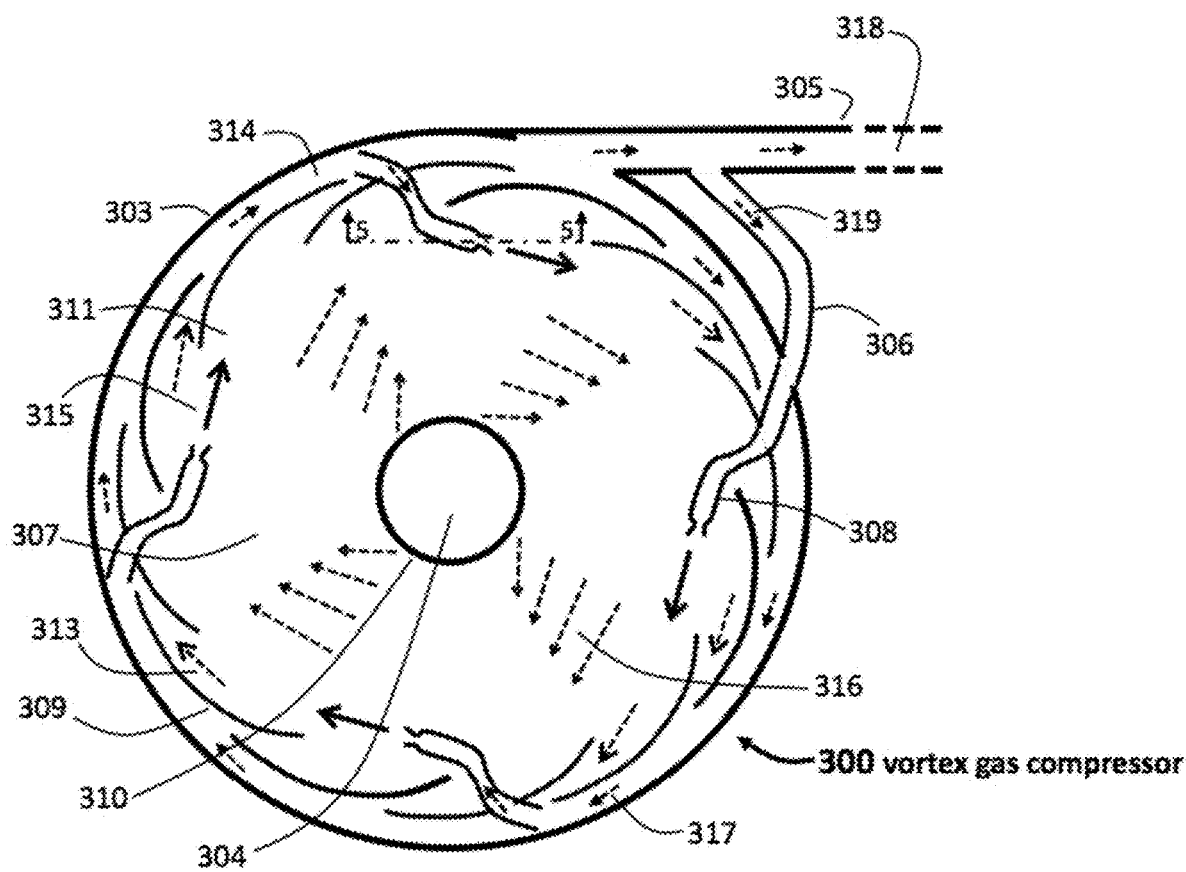
FIG. 3. Sectional Front View

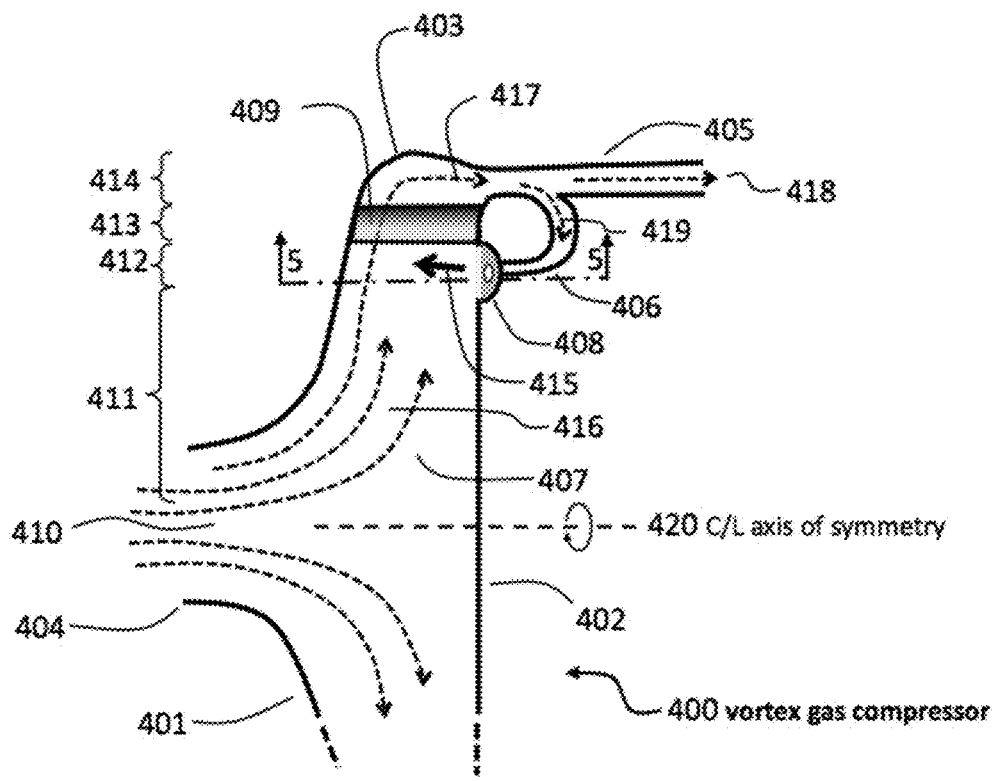
FIG. 4A. Sectional Side View
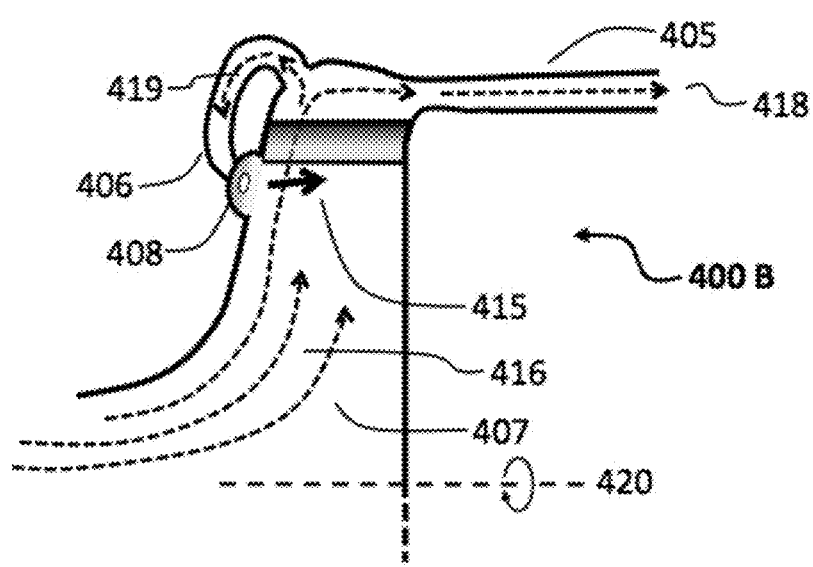
FIG. 4B. Sectional Side View

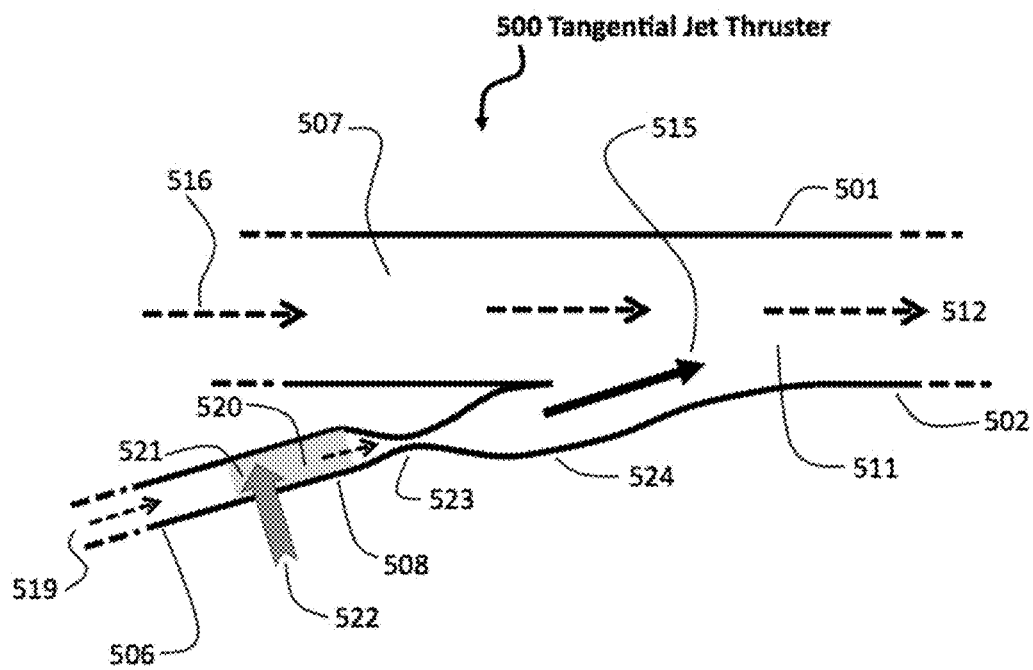
FIG. 5. *Sectional Top View At Section 5 Thruster Level*
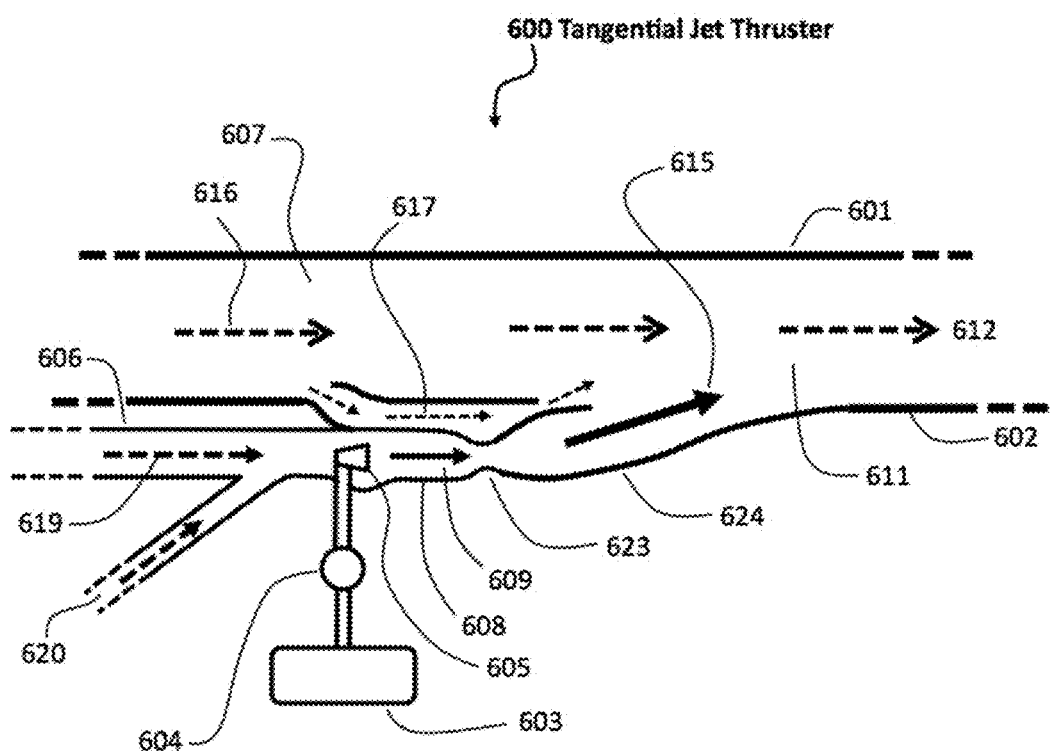
FIG. 6. *Sectional Top View At Section 5 Thruster Level*

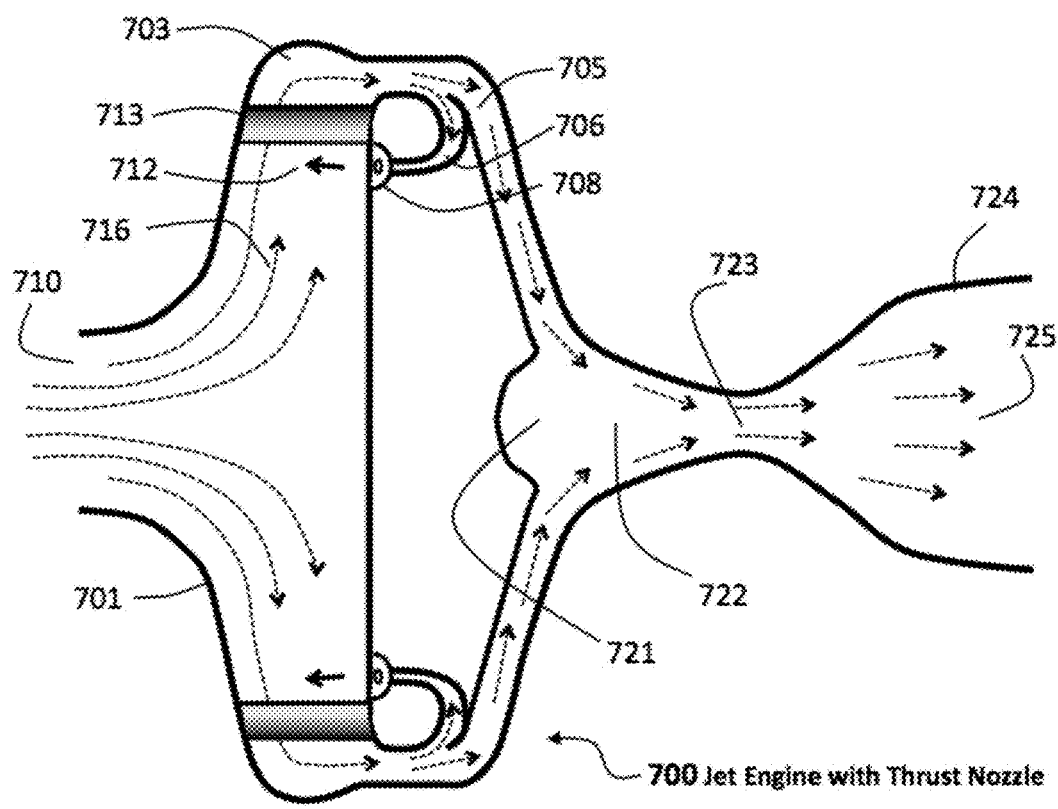
FIG. 7. Sectional Side View

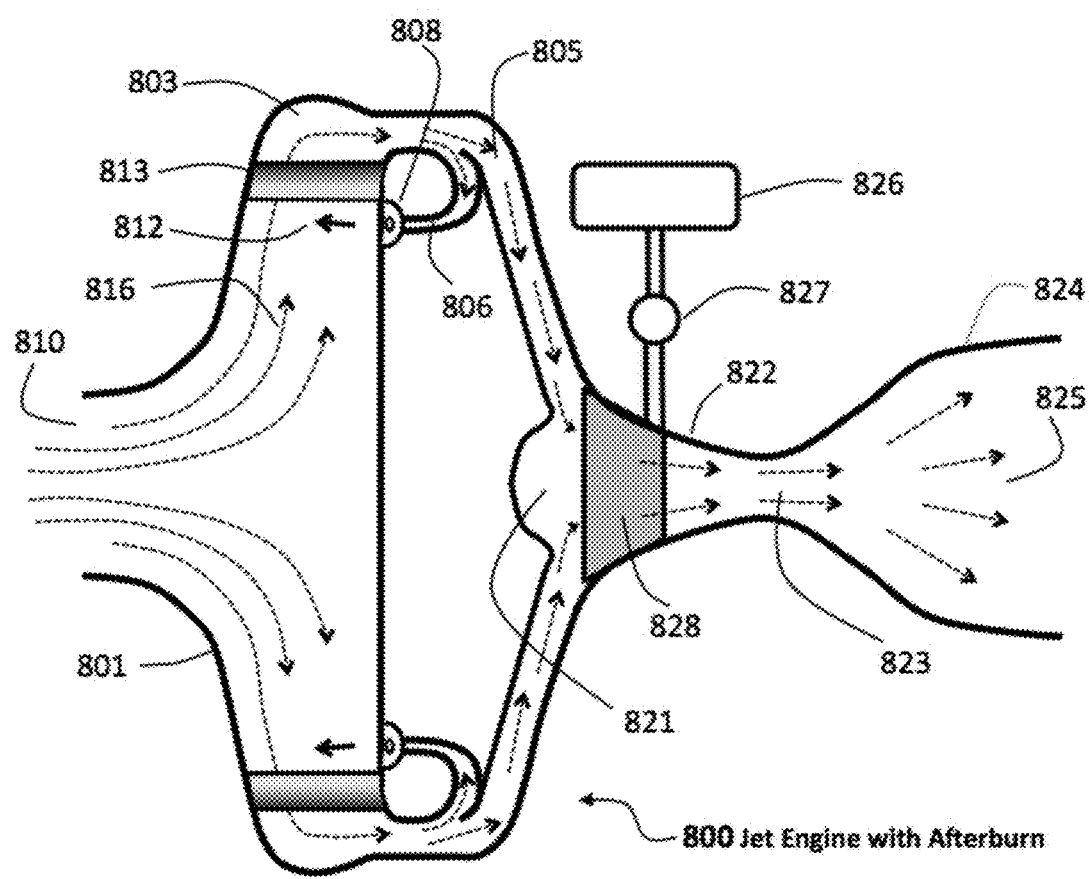
FIG. 8. Sectional Side View

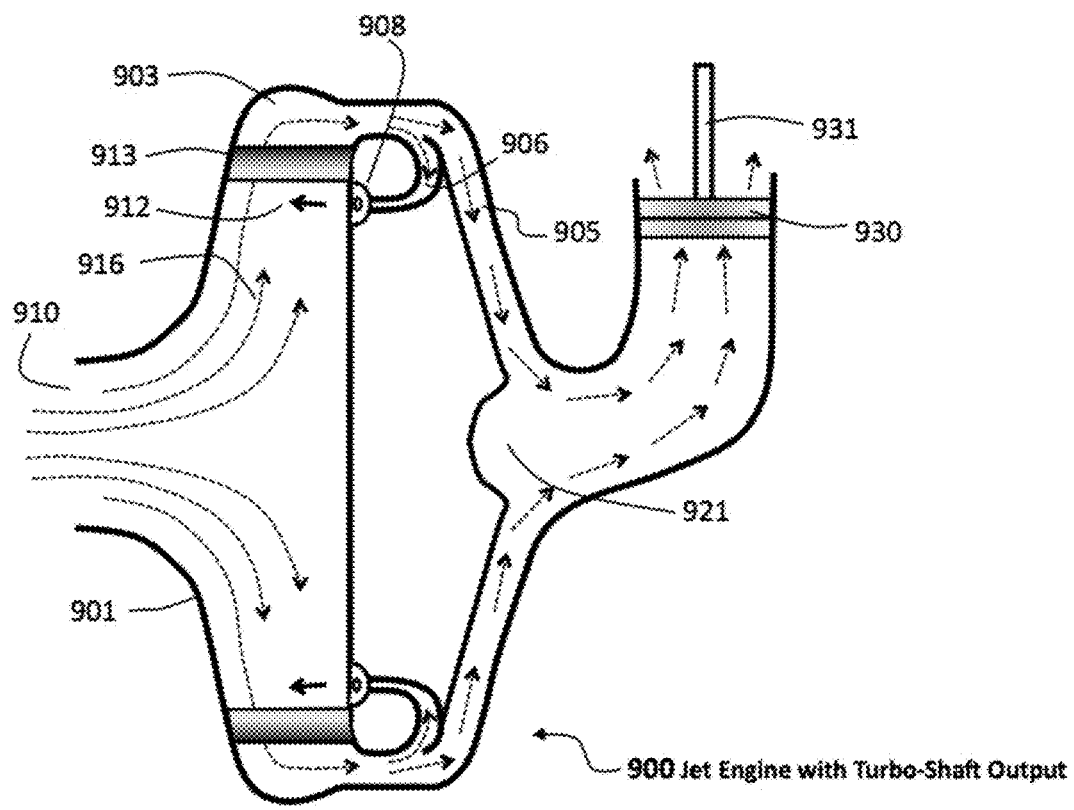
FIG. 9. Sectional Side View
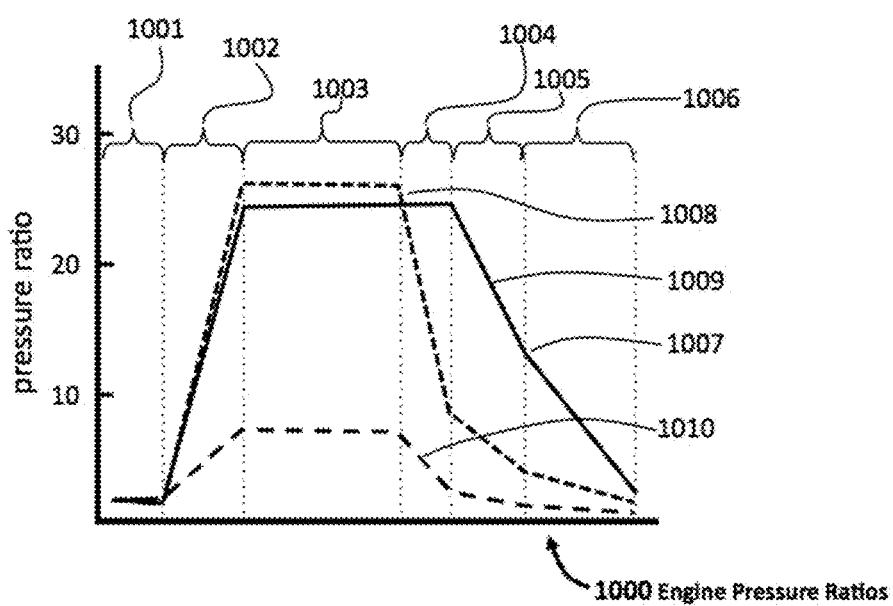
FIG. 10. Relative Pressure Profile

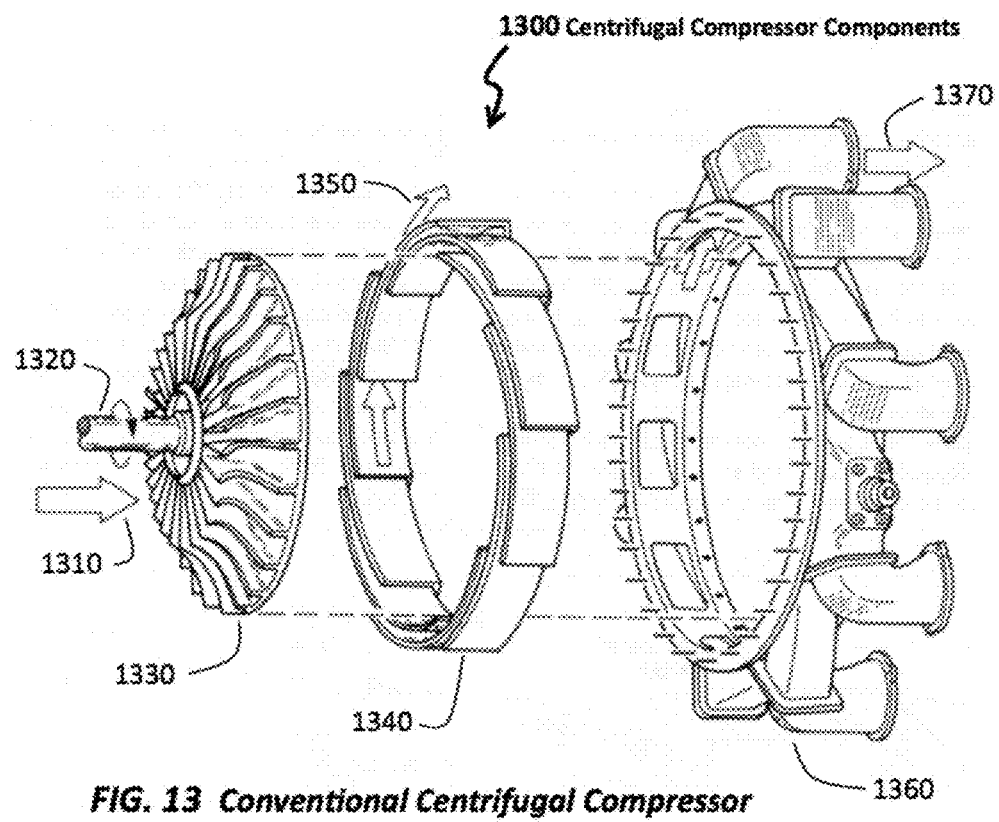
FIG. 13 *Conventional Centrifugal Compressor*
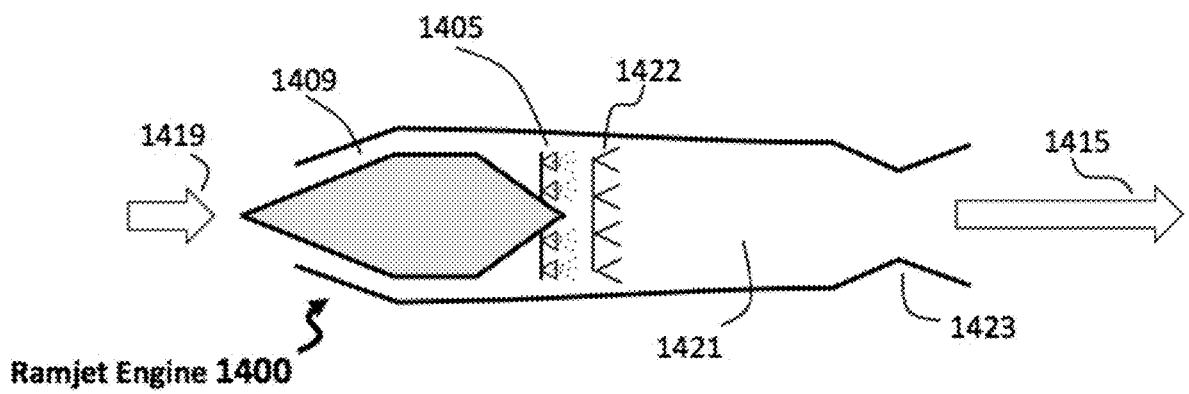
FIG. 14 *Ramjet Engine*

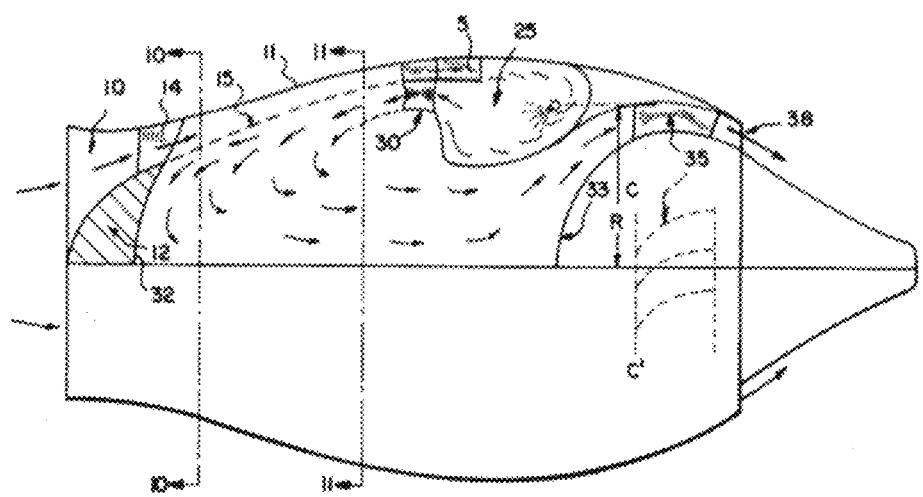
FIG. 15 Minardi Engine

CENTRIFUGAL GAS COMPRESSOR

CROSS-REFERENCE TO RELATED APPLICATIONS

There are no related applications.

STATEMENT REGARDING FEDERALLY SPONSORED RESEARCH OR DEVELOPMENT

There is no federally sponsored research or development.

THE NAMES OF THE PARTIES TO A JOINT RESEARCH AGREEMENT

There is no joint research agreement.

REFERENCE TO A "SEQUENCE LISTING," A TABLE, OR A COMPUTER PROGRAM LISTING APPENDIX SUBMITTED ON A COMPACT DISC

There is no sequences listing, table, or computer program listing appendix on a compact disc.

STATEMENT REGARDING PRIOR DISCLOSURES BY THE INVENTOR OR A JOINT INVENTOR

There are no disclosures by the inventor or a joint inventor.

BACKGROUND OF THE INVENTION

Field of the Invention

The present invention pertains to jet engines, and especially to jet engines without an axial drive shaft. Because there is no axial drive shaft, it also pertains to gas compressors, in which pressure rather than thrust is sought.

Description of the Related Art

A key portion of the present invention is an improvement over conventional centrifugal gas compressors. Such compressors are also sometimes called "radial compressors." The invention is a synergistic combination of two established devices: a centrifugal compressor and a ramjet engine. The invention combines these two devices in a novel and unique way. Schematic representations of these established devices are shown in FIGS. 13 and 14.

FIG. 13 shows an exploded view of a portion of a high performance centrifugal compressor. Four components are illustrated, a drive shaft 1320, a rotating impeller 1330, a diffuser 1340 and a collection manifold 1360. These four components are coaxially nested closely together as illustrated by the dotted lines.

Not shown in FIG. 13 are a back wall which fills in the back space inside the manifold and a front wall, also known as a "shroud." Both the front and back wall are attached to the collection manifold forming a high pressure air tight seal at the attachments. These two walls confine the air flow through the apparatus so that essentially all the air must flow between the vanes of the impeller and subsequently through the diffuser and into the manifold. The front wall has a central opening which admits air into the vicinity of the impeller.

Note that the impeller wheel is connected to a drive shaft 1320. This drive shaft rotates the impeller. In order for the device to function as a compressor there must also be a mechanism to rotate the drive shaft. In the case of gas turbine engines the drive mechanism consists of two components. The first of these is a fuel combustor which heats the air delivered by the compressor and further delivers this heated air to the second component. The second component is a rotary turbine which is connected to the drive shaft and rotates the drive shaft. These additional components are also not shown in FIG. 13.

In operation air 1310 flows into the compressor through a central opening in the front wall. Almost all of this air is trapped between the blades of the impeller 1330. As the impeller spins it creates in the air flow a forced vortex with a source. This vortex affects the passing air in two ways. First, it partially compresses the air through centrifugal force. Second, it imparts a high speed tangential velocity to the air which is spinning off the edge of the impeller wheel. This tangential velocity means that the partially compressed air also has substantial kinetic energy which can be converted into further compression of the air.

Additional compression of air is achieved by passing the tangentially fast flowing air into a diffuser 1340. This diffused airflow 1350 is slowed by the diffuser to a relatively slow tangential speed. This slowing inherently further compresses the air. The diffuser in FIG. 13 is a vaned diffuser. There are other types of diffusers but a vaned diffuser is generally the most compact. With careful design a vaned diffuser may have as much as 90% diffusion efficiency. That is, such a diffuser produces only a 10% loss in pressure ratio compared with the theoretical ideal.

The fully compressed airflow out of the diffuser is delivered to a collection manifold 1360. The manifold delivers the compressed airflow 1370 out to a subsequent apparatus. One particular form of such a manifold is shown in FIG. 13. Other configurations are also commonly found. All these types of manifolds deliver de-rotated air flow. In FIG. 13 the de-rotation is caused by passing the various subsidiary air flows through ninety degree rotation ducting. Also, in many cases the air streams that flows from various parts of the collection manifold are combined in a plenum so that the compressor ultimately delivers only a single air flow through a single duct.

Of the various mechanical components shown in FIG. 13, the present invention keeps only two, the diffuser 1340 and the collection manifold 1360. Airflows 1310, 1350 and 1370 pass through the present invention in same way as in a conventional centrifugal compressor.

The impeller 1330 and the drive shaft 1320 are missing from the present invention. These elements are replaced by a fixed array of tangentially oriented jet thrusters. The thrusters are mounted near the diffuser but at a slightly shorter radius. The thrusters form a pinwheel-like array and produce a very fast moving exhaust air flowing tangentially in a circle. The thruster high speed exhaust fully mixes with the air that is flowing in through the central aperture to form the vortex. This mixing means that there is complete momentum transfer between the thruster exhaust air and the mixed vortex air. This momentum transfer causes this inflowing air to accelerate and form the forced vortex.

In most respects the thruster forced vortex is similar to the forced vortex created by the impeller wheel. However, the thruster generated vortex can rotate at a much higher angular velocity than can an impeller induced vortex. The reason is that the tensile strength of materials limits the maximum tangential, or "tip," velocity of the impeller. Without this materials strength limitation, the invention can achieve a much higher tip velocity and therefore a much high pressure ratio than a conventional centrifugal compressor.

A second benefit is that the thruster induced forced vortex does not experience the slippage losses which are common with impeller induction. So, the thruster induced vortex centrifugally compresses the air with greater efficiency.

The thrusters in the invention are isomorphic to ramjet engines. However, the thruster's functional components are arranged somewhat differently than the comparable components of an aircraft ramjet engine. The primary difference is that the diffuser is located in the vortex chamber and is therefore separated from the fuel burning portion of the thruster. Isomorphic means, in this context, that the thrusters operate physically in exactly the same way as an aircraft ramjet engine. It also means that the functional thruster components correspond one-to-one with the functional components of a ramjet engine.

FIG. 14 illustrates a schematic section through an idealized aircraft ramjet engine. The numbering scheme in FIG. 14 is coordinated with FIGS. 3 through 6. As shown, an ideal ramjet engine has no mechanically moving parts except for the air flow through the engine. In practice, of course, a working engine must have a fuel pump and a variety of controls.

Basically, an ideal ramjet engine is a tube into which air 1419 flows in at a certain relative velocity. This relative velocity is usually the result of the high speed forward motion of the aircraft and engine. The airflow is modified inside the tube in such a way that it flows out 1415 of the tube at a much higher velocity than its in-flow velocity. At the entrance to the ramjet is a diffuser 1409. This device is isomorphic to the diffuser 309 in FIG. 3. That is, it performs the same function as the diffuser 309. The function of the diffuser 1409 is to slow down the entering air and thereby compress it.

The compressed air then proceeds to a combustion section. In this section is a fuel injector 1405 which is isomorphic to the fuel injector 605 in FIG. 6. The fuel mixed air then passes by a flame holder 1422 which ensures stable combustion in the relatively large combustion region 1421. It is not expected that the invention's thrusters will need a flame holder because these thrusters are relatively small. In this respect the combustion process in the thrusters will more likely resemble that taking place in the thrust chamber of a liquid fuel rocket engine.

As the air passes through the combustion region 1421 it is heated at essentially constant pressure by the combustion. This raises the static temperature and enthalpy of the air sufficiently that the air may be accelerated to a very high velocity by passing it through a nozzle 1423. This nozzle corresponds to the thruster nozzle 623 of FIG. 6. This comparison between an integrated ramjet engine and the invention's thrusters shows that they both function in essentially the same way, even though the invention thrusters depend on a remotely located diffuser and its connecting compressed air transmission ducts.

It is important to recognize that the performance of both a ramjet engine and the invention thrusters strongly depends on the diffusion process. The job of the diffuser is to deliver high pressure air to the rest of the device. In a ramjet engine this air is in relative motion because of the aircraft and its engine's forward motion through the air. In the case of the thrusters the air is in relative motion because of the vortex flow that the thrusters, themselves, are inducing. Table 1 shows just how important is the relative free stream velocity of the air as it flows into the ramjet's diffuser.

TABLE 1

RAMJET PERFORMANCE

| Mach Number | Pressure Ratio | Specific Thrust |
|---|---|---|
| 0.5 | 1.15 | 15 |
| 1.0 | 1.7 | 81 |
| 1.5 | 3.2 | 116 |
| 2.0 | 7 | 141 |
| 2.5 | 15 | 159 |
| 3.0 | 33 | 172 |
| 4.0 | 135 | 188 |

The table is constructed for a combustion temperature of 3500 degrees Rankine. Mach 1 is the speed of sound. The pressure ratio is calculated with 90% diffuser efficiency. The specific thrust is the number of pounds of thrust delivered with an air inflow rate of a pound per second. The pressure ratio and the resulting specific thrust are both important measures of the engine's performance.

The table shows several important characteristics. The most important message is that engine performance is poor if the relative air inflow velocity is below Mach 2. Below Mach 1 there is negligible pressure rise and negligible specific thrust. At Mach 2 the ramjet engine begins to be competitive with conventional turbojet engines, except that its fuel consumption is typically much higher than with turbojet engines. At Mach 3, and above, the ramjet engine is superior to turbojet engines in essentially every respect. However, the thrust performance essentially flattens out at about Mach 3, so there is little performance gain above that velocity with the exception that fuel consumption somewhat diminishes.

The importance of table 1 is that the operating conditions of the invention's thrusters are approximately the same as a ramjet engine flying at Mach 3. This will be discussed elsewhere.

Patent Search

An extensive patent search did not show any anticipation of the present invention. However, it did disclose an interesting jet engine patent that has a superficial resemblance to the present invention. That patent is Minardi, U.S. Pat. No. 4,689,950. FIG. 15 shows the Minardi engine as defined in his patent.

Minardi teaches a jet engine with only airflow through it. In this respect it is analogous to both a ramjet engine and to this invention. Unlike the classical ramjet, but like the present invention, the engine disclosed by Minardi is intended to function while standing still.

Also like the present invention, Minardi uses vortexes as key elements in its operation. However, Minardi's vortexes are different in both design and function from this invention, as will be seen below. In all essential respects the two engines are substantially different.

It is useful to provide a partial summary of the very important distinctions between Minardi and the present invention. Such a comparison should clear up any questions about a possible heritage relationship between the present invention and Minardi.

In the present invention air flows into an aperture at the axial center of the apparatus. The air then flows radially outward. Minardi flows air into peripheral apertures at the maximum radius away from the axial center. The air then flows radially inward.

The present invention employs a single supersonic forced vortex with a source. Minardi uses two vortexes and these are both subsonic. Minardi's vortexes have a maximum tangential velocity less than half the speed of sound. The first Minardi vortex is a forced vortex with a sink and the second, downstream, vortex is a free vortex with a source.

The present invention divides air flowing from the manifold into two separate streams. The minor stream is recirculated to the thrusters, the major stream passes out of the compressor and flows to a useful work device. In Minardi there is only a single airflow. That airflow circulates in a continuous stream around the device from entrance to exit and is never divided.

The present invention propels its supersonic vortex with hyper velocity thruster air that directly collides with the vortex air and is fully absorbed and mixed into the vortex air. In the present invention all of the thruster produced momentum is transferred to the ingested vortex air. Minardi's first vortex acts to induce, or propel, the flow in the ingested air by a shearing motion. In other words, in Minardi the momentum transfer mechanism is air stream to air stream friction rather than collision and mixing. As a consequence, in Minardi only part of the momentum of the propelling air is transferred to the ingested air. In Minardi, direct collision and mixing of the two flows is to be avoided as much as possible.

In the present invention the propelling air from the thrusters is entirely outside (at a larger radius than) the inflow of air into the vortex. In Minardi the propelling airflow is inside (at a smaller radius than) the ingested airflow.

The present invention generates strong centrifugal compression (23:1 up to 40:1 depending on the ambient temperature). Minardi has no centrifugal compression. Minardi's very small 1.15:1 compression is due only to air heating and expansion.

The present invention produces a specific thrust in the range of 100 to 200. Minardi produces a specific thrust of 15, or less (see table).

BRIEF DESCRIPTION OF THE SEVERAL VIEWS OF THE DRAWINGS

FIG. 1 is a functional block diagram of a typical gas turbine jet engine. It represents prior art.

FIG. 2 is a functional block diagram of the invention in its embodiment as a jet engine.

FIG. 3 is a frontal section view through the vortex chamber of a compressor assembly.

FIGS. 4A and 4B are side sectional views through the center of the vortex chamber assembly. The views show two different thruster and ducting arrangements.

FIG. 5 is a top sectional view through a portion of the vortex chamber at the level of a thruster.

FIG. 6 is another sectional view through a portion of the vortex chamber at the level of a thruster.

FIG. 7 is a sectional side view of a complete jet engine.

FIG. 8 is a sectional side view of a complete jet engine which includes a afterburner assembly.

FIG. 9 is a sectional side view of a complete gas turbine engine with a free turbine and drive shaft output.

FIG. 10 is a relative profile of pressures through different successive sections of three different engines.

FIG. 13 is an exploded view of part of a conventional centrifugal compressor.

FIG. 14 is a side schematic view, in cross section, of a conventional ramjet engine.

FIG. 15 is a cross section of the Minardi engine taken from his patent.

GENERAL THEORETICAL CONSIDERATIONS

Figure 11A:
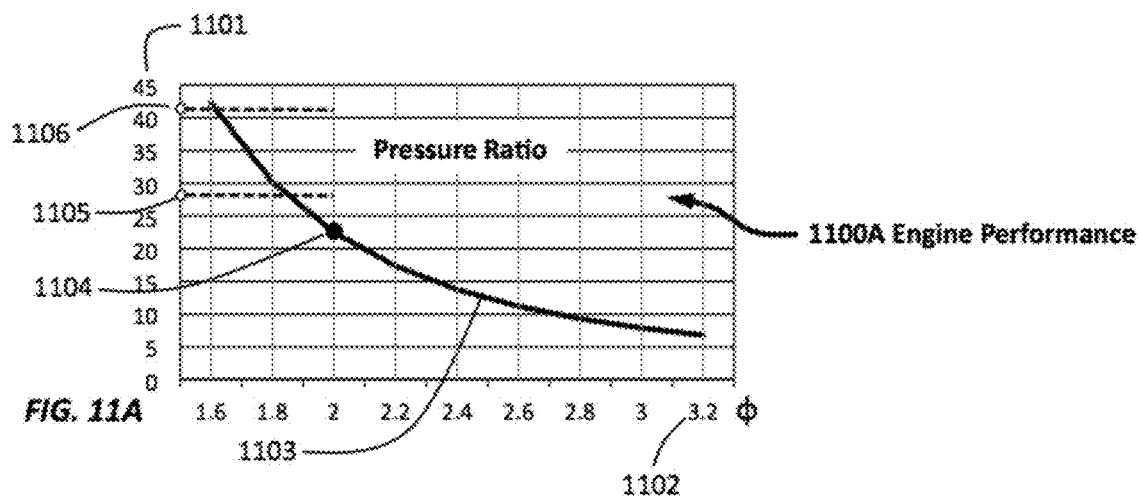
FIG. 11A is a chart of the predicted pressure ratios of the embodiment of FIG. 7.

A gas turbine engine has two main parts: a turbine powered air compressor assembly and a coupled device that produces useful work.

The compressor assembly of a conventional gas turbine engine has: 1) a mechanical air compressor, 2) a fuel burning combustor to further heat the compressed air, 3) a high pressure turbine which extracts energy from the heated, compressed air, and 4) a drive shaft by which the turbine powers the mechanical air compressor, and possibly other devices.

A useful work device, coupled to the compressor assembly, relies on the fact that the compressor driving high pressure turbine does not deplete all of the fuel supplied energy during air compression. Thus, there remains enough available energy to power a useful work device. Of the various possible propulsion, or power generation, devices which could convert the compressed air into useful work the most common are: 1) a nozzle which generates thrust for propulsion, 2) a connection to the compressor drive shaft to provide rotary power for an external useful work device, 3) a downstream (free) turbine which produces rotary torque and power, or, 4) some combination of the above.

High performance gas turbine engines require a high pressure ratio. High pressure engines tend to be complex, heavy and expensive. A high output pressure is usually needed to drive various useful work devices such as a free turbine or a thrust nozzle. The higher the pressure ratio the more power is needed to drive the compressor. Since this power is derived from the high pressure turbine, a high pressure ratio may require multiple turbine stages. Each turbine stage has about a fifty percent pressure drop. The total temperature drops about fifteen percent through each stage. Therefore, a two stage turbine will have a pressure drop of about seventy five percent and a total temperature drop of thirty percent, or more. This large pressure and temperature drop robs the engine of power to subsequently drive various useful work devices. The turbine pressure loss particularly robs afterburning aircraft engines of their performance potential.

A need exists for a way around the existing limitations of conventional gas turbine engines. This invention is intended to meet that need in a new way, and thereby deliver superior performance.

Detailed Theoretical Considerations

Definitions: A full forced vortex is defined, for our purposes, as a mass of gas which rotates as a unit and which extends from the center of rotation to the radius of maximum tangential velocity. If the mass of gas does not extend from the center of rotation, but begins at some radius away from the center, we define this as an annular vortex. The flow ratio is the ratio between the mass of gas that flows completely through the engine to the mass which is recirculated into the thrusters. Specific thrust is the ratio between the engine's thrust in pounds and the mass flow into the engine in pounds/second. A higher specific thrust means a smaller air intake and less drag on the aircraft.

The evolution of this invention started with early attempts to understand how a hilsch tube functions. The hilsch tube is a device in which a full forced vortex is created by means of the high velocity gas flow from an array of tangential thruster nozzles. This device supplies cold gas without moving parts except for the air flow. It therefore provided one of several inspirations for this invention. Another contributing set of ideas came from the technology of fluidics and fluid amplifiers.

A major insight was the realization that a conventional, impeller driven, centrifugal compressor engine actually functions by creating a full forced vortex in the compressor. An additional insight was that the turbine which powered the compressor likewise creates a forced vortex—though in the form of an annular vortex. By combining the two vortexes into a single vortex a centrifugal compressor engine of great simplicity might result.

The problem of how to drive the combined vortex was solved by the introduction of a fixed pin wheel arrangement of thrusters—somewhat similar to the thrusters in a hilsch tube but with different mechanization. The final element of the invention's conception was the realization that highly compressed air could be supplied to the thrusters by tapping off part of the output from the compressor. This recirculated air provided the positive feedback conventional engines get from the turbine and drive shaft. This recirculation, together with heating inside the thrusters, made the thrusters into miniature ramjet engines.

At this stage of conceptual development all the physical elements of the invention were in place: The spinning impeller wheel, and its powering turbine stage, had been eliminated. The required positive feedback was provided by recirculating compressed air. No longer were there moving parts, except for the air flow. Also, a conventional engine's combustors had now been fully integrated into each individual thruster.

It was further realized that, with the elimination of mechanically rotating parts, the maximum tangential velocity of the forced vortex—the "tip" velocity—could potentially be very much greater than with existing centrifugal compressor engines. The anticipated consequence was that a much higher pressure ratio might be possible than could be achieved with an impeller driven compressor. In addition, the elimination of the turbine section also eliminated the large pressure and temperature loss from such a turbine. Potentially therefore, the performance of an engine of this type could be greater than the best existing engines. But that was yet to be determined.

The preferred embodiment uses thrusters which are isomorphic to subsonic combustion ram jet engines. The question arose as to how these thrusters could produce sufficient thrust when ram jet engines only become efficient at relative air velocities of Mach 3 or above. It did not seem feasible that the invention's vortex could reach such a high velocity.

It turned out that a key factor had been left out of the analysis. This factor was the compressive effect of centrifugal force.

For a full forced vortex, gas compression builds up, through centrifugal force, from the center of rotation to the outer edge of the forced vortex. The added compressive enthalpy exactly matches the kinetic energy of the tangential velocity. This doubling of the total kinetic enthalpy is expressed by the Euler Whirl Equation. Thus, the Euler Whirl Equation says that the kinetic enthalpy delivered by the tangential air flow of a full forced vortex is twice that of a linearly moving stream of air.

Because of the added centrifugal force term, vortex air that is flowing at a feasible Mach 2 gives approximately the same total enthalpy and compression ratio as a linear stream of air flowing into a conventional ram jet engine at Mach 3.

The Euler Whirl Equation also greatly simplified the analysis and led to quantitative predictions of very high engine performance. As a result, the predicted performance of invention embodiments is very much greater than today's best jet engines.

The new analysis showed that a single stage compression ratio greater than 25 is feasible, particularly at high altitude where the ambient temperature is reduced. Without turbine losses in the new engine this pressure is delivered to the engine's exit (just before the main thrust nozzle). Afterburning in the new engine is therefore very efficient. Thus, the afterburning new engine would be nearly as fuel efficient as today's axial flow engines operating without afterburn. And, the new engine, when operating in afterburn, would have substantially greater specific thrust than existing engines and therefore much lower aerodynamic drag.

More recent analysis shows that the turbulence created by the inelastic collision of the high speed thruster gas with the lower speed vortex gas may provide a significant benefit. The reason is that turbulence temporarily acts as an energy storage device. It is expected that, in embodiments of the invention, the collision turbulence will deposit most of its energy as heat after the full pressurization. In so doing it would act analogously to the combustor in a conventional gas turbine engine. The turbulence thereby would scavenge the waste energy in the inelastic gas collision and allow that energy to be reused. Thus, the delayed release of the turbulence energy acts to decrease fuel consumption and increase the velocity, and force, of thrusting gas exiting from the compressor.

REFERENCES

1. Driggs, I. H., & Lancaster, O. E., "Gas Turbines for Aircraft," Ronald Press Co., N.Y. 1955.
2. Hesse, W. J., & Mumford, N. V. S., "Jet Propulsion for Aerospace Applications," $2^{nd}$ ed., Pitman Publishing, N.Y., 1964.
3. Kerrebrock, J. L., "Aircraft Engines and Gas Turbines," The MIT Press, Cambridge, Mass. 1992.
4. Archer, R. D., & Saarlas, M., "An Introduction To Aerospace Propulsion," Prentice Hall, N.J., 1996.
5. Mattingly, J. D., "Aircraft Engine Design $2^{nd}$ Ed.," AIAA Education Series, AIAA, Reston, Va., 2002.
6. Cumpsty, N. A., "Compressor Aerodynamics," Krieger Publishing Co., Malabar, Fla., 2004.
7. Kirshner, J. M., Editor, "Fluid Amplifiers," McGraw-Hill, N.Y. 1966.
8. Pourmahmoud, N., & Akhesmeh, N., "Numerical Investigation of the Thermal Separation in a Vortex Tube," World Academy of Science Engineering and Technology, Vol:2 2008 Jul. 23.

United States Patents

| | | |
|---|---|---|
| 2,920,448 | January 1960 | Coanda . . . |
| 3,925,981 | December 1975 | Etessam . . . |
| 3,927,958 | December 1975 | Quinn . . . |
| 4,118,929 | October 1978 | Sharpe . . . |
| 4,689,950 | September 1987 | Minardi et al. . . . |
| 6,457,305 | October 2002 | Schierbaum . . . |
| 9,021,784 | May 2015 | Sharpe . . . |

DETAILED SUMMARY OF THE INVENTION

This invention provides a new type of gas compressor which has no major moving parts except for the flow of the gas. The gas compressor is a system which comprises a physical structure, one or more gas thrusters, a device to heat the gas flowing through the thrusters, and a diffuser. The structure confines and directs the flow of gas passing through it. The thrusters create a high speed full forced vortex within the structure which partially compresses the gas by means of centrifugal force. The diffuser further compresses the flow of vortex gas by appropriately slowing it to a significantly lower velocity.

This invention also creates a system whereby this new type of compressor delivers compressed gas to various types of useful work devices. Useful work of various kinds is thereby created. The resulting system comprises a gas compressor of the new type and a useful work device.

This invention also creates embodiments where the compressed gas may be further heated by a device such as an afterburner.

Other embodiments show that any of the above systems can include one or more of the following features and combinations:

A key class of embodiments heat the gas in each thruster by injecting and burning fuel.

In some embodiments the compressor is an open system, with the flowing gas being derived from an outside source and delivered to an outside system.

Embodiments are described with a starter mechanism consisting of an intermittent source of high pressure supplementary gas which flows into one, or more, of the high velocity gas thrusters.

Embodiments are described which use a reduced size rotating impeller centered on the region of the vortex; the impeller radius being substantially smaller than the radius of the high velocity gas thrusters; the impeller being operated intermittently.

Embodiments comprise systems using the new type of compressor where the compressor feeds a useful work device.

Many of the embodiments feed air from the compressor to a thrust producing nozzle.

Alternative embodiments feed the compressed air to a turbine which produces rotary work.

Some embodiments feed a turbine, which performs useful work, and the exhaust from the turbine is subsequently passed through a thrust producing nozzle.

Some embodiments comprise systems using the new type of compressor where the gas output from the compressor is further heated by a combustion device and the heated gas is delivered to a useful work device.

Some embodiments comprise systems where the output gas of the new type of compressor is further heated and this further heated gas is passed through a nozzle to produce thrust.

Some embodiments comprise closed systems with the new type of gas compressor and a useful work device where the flow of gas is completely recirculated, the gas passing through a heat exchanger connected to an outside system. The heat exchanger cools, expands and decompresses the recirculating gas before returning it to the new type of gas compressor.

DETAILED DESCRIPTION OF THE INVENTION

The major new component of this invention is a new type of gas compressor. This compressor may be employed in closed cycle machinery or in open cycle machinery. Since the compressor is a heat engine, when it is employed as part of a closed cycle machine it must have a heat exchanger, or radiator, to cool the gas which is being recirculated from the output of the compressor back to the input of the compressor. For open cycle applications no such heat exchanger is required.

Closed cycle machines may use any gas. However, open cycle machines will almost always use air from the atmosphere. Some applications, such as in the chemical processing industry, may use a gas other than air during open cycle operation. Still, open cycle machines most often will be employed in the same applications as existing gas turbine engines.

The mark of a good design is simplicity while delivering excellent performance. The aircraft engine with the ultimate in simplicity and performance is the subsonic combustion ramjet engine. That engine functions efficiently in the range from Mach 3 to Mach 5. It consists of an entry diffuser which slows and compresses the ingested air. A fuel mixer and combustor and an exit nozzle to accelerate the heated air to produce thrust.

The present invention introduces an engine of comparable simplicity which works efficiently from zero velocity to Mach 3. Like the ram jet engine it has no moving parts other than the air flow through the engine. Like the ram jet, over its normal operating range it promises superior performance.

One of this invention's novel features is a vortex compressor which gives approximately an eight to one pressure ratio through centrifugal compression and greater than three to one additional pressure ratio through diffusion of the fast flowing air. A second novel feature is recirculation of part of the compressed air to combustors which feed the additionally heated and compressed air through delaval nozzles. These nozzles greatly accelerate the heated air. The heated air is then used to accelerate and sustain the compressing vortex. In all other respects the new engine is similar to a ram jet engine.

FIG. 1 Provides an example of prior art (references 1 through 5). The figure is a functional overview 100 of a conventional gas turbine jet engine of the simplest type. It is laid out in conventional form. The engine has only two major components, a compressor assembly 112, and a useful work device 113.

Since this invention employs only centrifugal compression, this description of a conventional gas turbine engine 100 is limited to one with a centrifugal compressor.

Analysis of the engine starts with air entering the engine through an air intake 101. The air then flows into a centrifugal air compressor which is part of the compressor assembly 112. The centrifugal compressor comprises multiple functional subassembly parts starting with a centrifugal impeller 102. As this impeller rotates it induces the air to rotate as a forced vortex with a source 103. As a result of centrifugal force, some compression and heating takes place while the air is passing through the impeller.

In order to fully understand the invention it is essential to recognize that a conventional impeller induces a forced vortex with a source, the source being the air flow into the compressor—typically in, or near, the rotational center of the vortex. The simplest type of forced vortex is a rotating mass of air which has a tangential velocity that is proportional to the radial distance from the center of rotation. To good approximation, this mass rotates as if it were a solid object. This mass of air is therefore called "rotational." In general, the rotation must be forced by some external mechanism such as an impeller.

At a radius beyond the forced vortex region the tangential velocity of the rotating mass of air diminishes inversely with increasing radial distance. This is the flow region of a free vortex. Examination of any small element of a free vortex shows that this element does not locally rotate as sweeps in a circle around the center of rotation of the air mass. As a result, the rotation characteristic of a free vortex is called "irrotational." In practice this means that any gas element of a free vortex has translational kinetic energy but it does not have any rotational kinetic energy or internal centrifugal force (reference 7).

When the forced vortex has a source, such as the central inflow into the compressor, there will be additional radial flow in the outward direction forming a spiral flow. This makes the description of the vortex slightly more complicated. For our purposes detailed analysis only needs to take into consideration the tangential flow because the tangential velocity is generally very much larger than the radial velocity. Thus, the forced vortex flow approximately behaves as a simple forced vortex.

As air passes radially out from the outside edge of the impeller, its rotational characteristic changes from a forced vortex to a free vortex. If the radius of the free vortex region is large enough, there will be a natural pressure rise as the tangential velocity of the air slows down with increasing radius. Thus, the free vortex region acts as a natural, and highly efficient, diffuser. However, the overall radius of the free vortex region must then be very large if free vortex diffusion is to be effective.

There are two additional types of diffusers which make the compressor more compact. The physically larger of the two is a volute diffuser. The much more compact preferred embodiment, found in most gas turbine engines, is a vaned diffuser. A vaned diffuser employs a set of stationary spiral-form diffusion vanes. With only moderate pressure loss these vanes rapidly slow and compress the high speed tangential and radial flow of the air being spun off the rotating impeller. The fully compressed air which results is then collected by a manifold and is delivered to multiple other devices.

Existing materials limit the rotational velocity of the conventional impeller. At the present time the tangential velocity—the practical "tip" velocity—allowed by most materials is about 1600 feet per second. If there were no losses this could produce a pressure ratio of about eight. But the realized pressure ratio is significantly less—typically six or less—because of losses. Some exotic material impellers permit substantially higher single stage compression ratios but these remain mostly in the laboratory (reference 6).

As the air spins off the impeller it has a high tangential speed as well as a radial flow. This high speed air flow is passed into a diffuser 104. The diffuser slows the air to a relatively low velocity and further compresses, and heats, the air.

The gas flowing out of the diffuser section passes into an apparatus combination 105. This combination consists of a combustor array 106 and a stator nozzle array 107. The combination 105 is analogous to the array of thrusters 205 of this invention as described in conjunction with FIG. 2.

The diffuser section is followed by a manifold collection device (not shown) which directs the air into a combustor 106. In the combustor, fuel is burned which heats the air.

The heated air is then passed through the stator array 107 of a turbine. Most high pressure turbines are impulse turbines. For this type of turbine the stator blades form an ensemble of delaval nozzles. During the air's stator passage the heated air is accelerated to sonic or supersonic speed. The result is the creation of a high speed forced vortex 108 in the narrow region between the stator and the turbine rotor. The resulting forced vortex interacts with the rotor 109 to spin up the rotor and thereby deliver energy from the vortex air to the rotor. The air pressure drops by approximately 50% per stator-rotor pair. The air temperature likewise decreases by about 15% (these are measures at the throats of the stator nozzles).

The turbine rotor spins the impeller of the centrifugal compressor via a drive shaft 111. The residual air exhausted from the turbine still has enough energy to power some useful work device 113. In FIG. 1 this air is accelerated through a propulsion nozzle 110, acting as a work device, so as to provide thrust.

In most respects this functional flow description of a gas turbine engine is conventional. However, this description is somewhat different in that it explicitly includes the air vortices, 103 and 108, which exist in such an engine but which are commonly ignored. This recognition of the existence of these vortices is critically important in understanding the invention.

This analysis clearly shows that perhaps the key function of the conventional compressor assembly of a gas turbine is really to create high speed forced vortices. In a conventional gas turbine two such vortices are created and these must be linked together by complicated machinery. In principle, however, there need only be one high speed forced vortex to provide the function of compressing the air. This, the invention provides. Moreover, it is the invention's much higher speed vortex which gives the invention its superiority.

FIG. 2 provides a functional block diagram of an embodiment of the invention as a jet engine. The invention 200 is shown in schematic form. An air intake 201 delivers air into a compressor assembly 212. The assembly includes a vortex chamber (not shown) within which a full forced vortex 203 is established. In this vortex there is both tangential and radial flow of air. The very nature of the forced vortex partially compresses the air by means of centrifugal force. The forced vortex air is passed through a diffuser 204 which further compresses and also heats the air.

By passing the vortex gas through a conventional diffuser, the kinetic energy stored in the rotating velocity of the vortex is used to finish compressing the vortex gas. The diffuser is identical in form and function to those found in conventional gas turbine engines.

The air passing out of the diffuser is collected by a manifold (not shown) and is divided into two flows. The minor flow is diverted, by means of ducts, to an array 208 of tangentially oriented thrusters 205 (one or more). This air will be recirculated back into the vortex. Each thruster has its own air supply duct so that it is physically isolated from the other thrusters. Within the air duct of each thruster is a combustor 206. Here the air is mixed with fuel and burning takes place. The further heated air is then passed through a nozzle 207 and is accelerated to very high speed. This high speed exhaust collides with the vortex air and thereby applies a tangential accelerating force to the forced vortex 203.

The diffuser 204, the thruster air feed duct, the combustor 206, and its associated nozzle 207 together make up a small, tangentially oriented, ramjet engine 240 which might be called a "spin thruster." Singly, or in combination, these thrusters form a kind of fixed pinwheel acceleration device. Each spin thruster in the pinwheel contributes a tangential high speed gas flow which helps maintain the very high speed air flow through the forced vortex. The entire complex of such thrusters, together with their air supply ducts, make up a thruster array 208. The vortex driving spin thrusters perform a function analogous to the vanes in the stator of a high pressure turbine. The analogous conventional thruster array 105 is the high pressure turbine stator in the conventional engine illustrated by FIG. 1.

When the forced vortex 203, the diffuser 204, and the thruster array 208 are considered together, along with the vortex chamber, the air collection and distribution manifold, we have the compressor assembly 212. Notice that there is no drive shaft in this compressor. Therefore there is no mechanical way of coupling to the compressor as is the case with conventional gas turbine engines. All subsequent connections to the compressor are by way of pressurized gas flow. The return flow through the thrusters serves to provide the same positive feedback that is developed by the turbine-driveshaft combination of a conventional gas turbine engine.

In the embodiment of FIG. 2, the major portion of the compressed air is delivered to a useful work device such as a propulsion nozzle 210. This propulsion nozzle generates thrust from its inflow of compressed and heated air. An alternative embodiment might pass the compressed air through a free turbine. A free turbine converts a portion, perhaps the major portion, of the energy of the pressurized air into useful rotary work.

Notice that in the embodiment of FIG. 2 there is no turbine immediately upstream of the propulsion nozzle. Thus, the air flowing through this nozzle has the full pressure and heat of the air flowing out of the air compressor assembly. There is no turbine loss because the function of the turbine is performed by the spin thrusters. This delivery of high pressure air to the useful work device, without significant loss, is one of the major factors which gives this invention superior performance.

In conventional gas turbine engines many compression stages are typically needed to produce a high pressure ratio. By way of contrast, in this invention only a single vortex stage is needed to achieve a high pressure ratio. The reason is that, without the material stress limit of a spinning impeller, the peak vortex tangential velocity can be significantly greater than the "tip speed" of a conventional centrifugal compressor.

A vortex produced pressure increase rises as an exponential function of the peak tangential or "tip" speed. Because the vortex in the invention does not have a materials limited impeller, its maximum tangential velocity can be much greater than is available with a conventional centrifugal compressor. Tangential vortex tip velocities significantly greater than 2000 feet per second are possible. As a consequence, single stage compression ratios on the order of 25:1, or more depending on flight conditions, appear feasible with the invention.

A major novelty of this invention is that all four of the separate conventional compressor assembly components (compressor, burner, turbine, drive shaft) are now fully integrated into a single device which has no moving parts except for the flow of gas. For example, there is no need for a drive shaft because the air return ducts to the thrusters provide this function. There is no need for a rotating centrifugal impeller because the high speed spin thruster exhaust gas drives the vortex and thereby performs the impeller function. There is no need for an external combustor because combustion takes place within the spin thrusters. And, there is no need for a turbine assembly because this function is provided by the spin thrusters.

With a single forced vortex providing both vortex functions most of the machinery of a conventional gas turbine compressor assembly can be eliminated. The invention provides the means for creating a single, high supersonic speed, forced vortex. And, it does so without mechanical moving parts. All major functions of this device are performed solely through gas flows.

As mentioned, in an air breathing engine the oxygen needed for the thrusters is derived from the output of the air compressor through recirculation ducts. These recirculation ducts perform the same conceptual function as the drive shaft of a conventional gas turbine engine. That is, these ducts provide positive feedback to help drive the thrusters and therefore the vortex.

The spin thrusters are functionally isomorphic to subsonic combustion ramjet engines. This is because exactly the same gas flow functions are performed by the thrusters as happen inside a ramjet. High speed air from the vortex is passed through a diffuser which slows and compresses the air. This highly compressed air is delivered to the thruster. Here fuel is burned to further heat the air (i.e. increase its enthalpy). The heated air is then accelerated through a nozzle to produce thrust. The only architectural difference between the spin thruster and a ramjet engine is that the spin thruster relies on a detached diffuser which is located in the vortex chamber.

FIGS. 3 through 6 illustrate the major components of the new type of compressor. These figures are schematic in nature and are intended simply to illustrate how the compressor works. They are not representative of a real embodiment in form or size or in detail.

FIG. 3 illustrates a face-on view of an embodiment of the new type of compressor. It is a section through the main vortex chamber showing the relative layout of the essential elements of the compressor. The figure is representative of a vortex gas compressor 300. The elements shown FIG. 3 are not to scale and do not illustrate the physical appearance, or precise arrangement, of the various elements. They are for instructional purposes only and are meant to provide an abstract representation of certain functional elements.

This conceptual figure resembles a face-on section through a conventional (i.e. impeller driven) centrifugal compressor. The resemblance is intentional because this is a centrifugal compressor and it therefore has many of the same stationary parts. The main change is that the rotating impeller, and drive shaft, have been replaced by a stationary pin-wheel array of thrusters and associated gas conveyance ducting. Aside from that change this compressor is essentially the same as a conventional centrifugal compressor.

Housing the components of the compressor is a structure comprising a vortex chamber 307, a gas collection manifold wall 303, an inlet aperture 304, a gas collection manifold 314, a gas inlet into the vortex chamber 310, and a compressor output duct 305.

A section line, 5-5, is also shown. This section line corresponds to the sectional views of typical conceptual thrusters as illustrated by FIGS. 5 and 6.

Within the vortex chamber structure 307 is the diffuser 309. All the gas flowing through the system flows through the diffuser. The diffuser, shown here as an array of vanes, slows down and fully compresses the gas flowing through it. There are three basic types of diffusers: 1) simple free vortex flow, 2) a volute diffuser, and 3) a vaned diffuser. Of the three, the vaned diffuser is by far the most compact, if not the most efficient. Because of its compactness, a vaned diffuser is the preferred embodiment for most applications.

Attached to the walls of the vortex chamber are an array of thrusters 308 (one or more). These thrusters are mounted at a somewhat shorter radius from the axial centerline than the diffuser vanes. The thrusters flow their high speed exhaust into the vortex chamber tangentially to the vortex flow. The tangential thrusters, also called "spin thrusters," are arranged like a pinwheel. As the high speed thruster exhaust flow mixes with the vortex flow it spins up the vortex gas to high rotational velocity.

In preferred embodiments the spin thrusters are mounted so that they are mostly on the outside of either the back wall, the front wall, or both walls of the vortex chamber. FIGS. 4A, 4B, 5 and 6 illustrate the general physical arrangement for these mountings.

Each of the thrusters is fed compressed gas by a gas return duct 306. Each of these ducts taps off some of the compressed gas 319 from the pressurized gas manifold 314, or its output duct 305.

Gas flows through this structure and interacts with the various functional components. The invention is not restricted to a single type of gas. However, for most applications, such as propulsion or power generation, the gas is likely to be ordinary air.

As we trace the flow of gas through this structure we discover that the gas flows into the vortex chamber 307 through a central inlet 310. There it merges with a forced vortex 316. The vortex gas sees a centrifugal force so that it also flows outward as it whirls around. This type of vortex is called a "forced vortex with a source." In the simplest type of forced vortex each element of gas flows in a circle. The tangential velocity of an element of gas is proportional to its radial distance from the center of rotation. In the case of a forced vortex with a source there is an additional radial component of gas flow. Thus, the actual path that an element of gas follows is a spiral. Efficient impeller designs acknowledge the spiral flow by having spiral vanes.

When an element of vortex gas reaches the radius of the spin thrusters it mixes with the very high velocity thruster gas flow 315. This takes place in a gas mixing region 311. In the gas mixing region there is a merger of the two streams of gas in such a way that momentum is conserved.

In a typical performance calculation We assume the industry standard Sea Level Static Thrust (SLST) operating condition. For SLST the ambient (i.e. outside) temperature is 518.7 degrees Rankine (° R). The gas inside the spin thruster is assumed to be heated to 3500 degrees Rankine. With 95 percent efficiency the thruster produces an exhaust gas flow velocity of 6607 feet per second. This very high velocity flow is mixed with the much lower vortex velocity with momentum being preserved. The flow ratio is chosen to be $\varphi=2$. With additional losses factored in, the mixed vortex gas leaves the mixing region at a tangential velocity of 2202 feet per second (momentum balance: 6607/(2+1)=2202). Note that this is a much higher velocity than the 1600 feet per second tip velocity that is the practical limit with a material impeller. The consequence is a much higher compression ratio. In this calculation a pressure ratio of 24.2 results with the assumption of 90% diffusion efficiency. This very high pressure ratio requires only a single stage compressor of the new type.

The foregoing calculation is the engine performance to be expected when the aircraft is sitting on the ground waiting to take off. As the aircraft ascends, the ambient temperature diminishes with altitude and the pressure ratio therefore increases correspondingly. Single stage pressure ratios on the order of 45:1 can be expected at cruise altitude.

The gas leaving the mixing region 311 passes 313 through a diffuser 309 and flows 317 into a gas collection manifold 314. This pressurized gas is collected by an output duct 305 and this gas 318 is split into two streams. A minor portion of the gas 319 is conveyed, through appropriate ducts (mostly not shown) to the various spin thrusters. The major portion is conveyed out of the compressor to other devices which may use the gas to do useful work.

FIGS. 4A and 4B illustrate sectional side views of similar embodiments of the new type of compressor. These are sections through the center of the main vortex chamber showing the relative layout of the essential elements of the compressor. They are representative of a vortex gas compressor 400. The elements shown FIGS. 4A and 4B are not to scale and do not illustrate the physical appearance, or precise arrangement, of the various elements. They are for instructional purposes only and are meant to provide an abstract representation of certain functional elements. The illustration is a partial sectional view of the vortex compressor. In reality the structure, and its elements are circularly symmetric around an axis of rotational symmetry 420.

In FIG. 4A a section line, 5-5, is also shown. This section line corresponds to the sectional views of typical conceptual thrusters as illustrated by FIGS. 5 and 6.

These sectional views show various structural elements of the vortex gas compressor. The structure consists of a front wall 401. The front wall 401 is sometimes referred to as a "shroud." There is also a back wall 402, a gas collection manifold wall 403, a gas inlet aperture 404, an output duct from the compressor 405, and gas recirculation ducts 406 which return compressed air to the spin thrusters. A preferred embodiment of the structure has a unique return duct for each spin thruster. These elements together form a unified structural assembly comprise a vortex chamber 407, a gas collection manifold 403, an outlet duct 405, and thruster recirculation ducts 406.

Within the structure are functional elements. These comprise one, or more, tangentially oriented spin thrusters 408 and a device 409 to diffuse the gas to higher pressure. The preferred embodiment of the diffuser device is a set of spiral-form vanes.

The only difference between FIGS. 4A and 4B is the placement of the spin thrusters and the ducts which feed them. In 4A the spin thrusters are mounted on the back wall. In 4B the thrusters are mounted on the front, or shroud, wall. Functionally there is not likely to be a difference in the performance that can be expected with these two placements.

In principle the thrusters could even be suspended in the midst of the vortex stream—midway between the two walls. However, since the vortex flow is expected to be high supersonic, there might be additional problems with shock waves with this placement. Thus, midstream placement of the thrusters is not a preferred embodiment.

There are multiple functional regions within the structure. Within each of these regions a different activity is taking place. A gas inlet region 410 delivers gas to a forced vortex region 411. The vortex gas flows both tangentially and radially. When an element of the gas reaches approximately the radius of the spin thrusters it is mixed with the high velocity gas 415 flowing from the thrusters. This takes place in the gas mixing region 412. Subsequently, the mixed gas flows into the region of the diffuser 413. As now fully pressurized gas flows out of the diffuser it is collected in the gas collection manifold region 414.

Observing the various gas flow activities within the structure, there is a very high velocity tangential exhaust flow 415 from the array of tangential spin thrusters 408. This tangential exhaust flow induces a forced vortex flow 416 in the vortex chamber 407. The vortex has a very low pressure near its axis of rotation. This low pressure sucks gas into the structure through the gas inlet 410. Once inside, the newly inducted gas replenishes the pressurized gas 417 that is flowing into, and out of, the diffused gas collection manifold 403. The pressurized gas that flows out of the collection manifold is divided into two flows. The major flow 418 is delivered out from the compressor and may be delivered to some subsequent useful work device. The minor flow 419 is delivered, via appropriate ducting, to the spin thrusters. This minor flow provides combustible gas to the thrusters. It also serves as the positive feedback mechanism needed for the compressor to function. In this role, the minor gas flow serves the same function as the drive shaft of a conventional gas turbine engine.

FIG. 5 illustrates a sectional top view of an embodiment of the new type of compressor at the radius of the spin thrusters. It is a section through the main vortex chamber (FIGS. 3 and 4A section 5-5) showing the relative layout of some of the essential elements of the compressor. The arrangement in FIG. 5 corresponds to the thruster geometry illustrated by FIG. 4A.

FIG. 5 is representative of a tangential jet thruster 500. The elements shown FIG. 5 are not to scale and do not illustrate the physical appearance, or precise arrangement, of the various elements. They are for instructional purposes only and are meant to provide an abstract representation of certain functional elements.

At the thruster radius the confining structure comprises a front wall 501 and a back wall 502. These walls confine the space of a vortex chamber 507. Within this vortex chamber are various gas flows 516, 515 and 512. These gas flows will be described shortly. Continuing with the description of the structure, there is also a compressed gas return duct 506 and tangential spin thruster 508.

The spin thruster is comprised of a section of the return duct 506 which serves as a thrust chamber 520. This thrust chamber feeds into a nozzle with a throat 523. Typically this nozzle serves as a delaval nozzle and it accelerates the thrust chamber gas to sonic speed. Downstream of the nozzle throat is an expansion bell 524 of the thruster. The expansion bell further accelerates this flow of gas so that a very high speed exhaust is achieved. Within the thrust chamber 520 the gas flowing though that region 521 is heated to a very high temperature. A source of heat 522 is responsible for heating the gas.

Prior to interacting with the gas flows from the spin thrusters there is a forced vortex flow 507 in the vortex chamber. The flow from a thruster derives from a return flow 519 of compressed air from the output of the compressor. This compressed gas flow passes into the thrust chamber 520 and is heated in a gas heating region 521 of the thrust chamber. The gas is then accelerated through the throat 523 of a nozzle and is further accelerated by an expansion bell 524 until it nearly reaches the maximum velocity allowed by its total temperature. This high speed flow of gas 515 from the thruster then mixes in the region 511 with the entering vortex gas 516. This mixing accelerates the vortex gas 516 and produces a combined gas flow 512 which is delivered to the diffuser.

There are various means for providing a substantial heat input to the thruster. One embodiment will be discussed in conjunction with FIG. 6. Another embodiment is of some interest. This is concentrated solar illumination. The solar embodiment employs some sort of optical element for each thruster, such as a Fresnel lens or a parabolic mirror, to focus sunlight down onto a particular spin thruster. A thruster temperature in excess of 2000 degrees Rankine is within the state of the art with solar illumination. Such a thruster operating temperature would give a Carnot efficiency of 75% and a practical efficiency above 60%. This practical efficiency is twice as great as what has been achieved with solar sterling engine systems. Moreover, because this new type of gas compressor is inherently very small and light weight it could easily be mounted at the focus of a low focal ratio (i.e., low "f-number") sun tracking parabolic mirror. This would make a compact, efficient and relatively low cost solar power generator. Materials, such as MoAlB coated $ZrB_2$ have been demonstrated to offer high oxidation resistance up to extreme temperatures, such as focused sunlight would create.

FIG. 6 illustrates a sectional top view of an embodiment of the new type of compressor at the radius of the spin thrusters. It is a section through the main vortex chamber (FIGS. 3 and 4A section 5-5) showing the relative layout of some of the essential elements of the compressor. The figure is representative of a vortex gas compressor 600. The elements shown FIG. 6 are not to scale and do not illustrate the physical appearance, or precise arrangement, of the various elements. They are for instructional purposes only and are meant to provide an abstract representation of certain functional elements.

The preferred embodiment is an engine that uses ambient air as an oxidizer. This doesn't preclude other embodiments which use a combustible gas that ignites with an appropriate "fuel."

At the thruster radius the confining structure is comprised of a front wall 601 and a back wall 602. These walls confine the space of a vortex chamber 607. Within this gas compression apparatus are various air flows 616, 615, 612, 619, 617 and 620. These gas flows will be described shortly. Continuing with the description of the structure, there is also a compressed air return duct 606 and a tangential spin thruster 608.

The spin thruster comprises a section of the return duct 606 which serves as a thrust chamber 609. This thrust chamber feeds into a nozzle with a throat 623. Typically this nozzle serves as a delaval nozzle and it accelerates the thrust chamber air to sonic speed. Downstream of the nozzle throat is an expansion bell 624 of the thruster. The expansion bell further accelerates this flow of air so that a very high speed exhaust is achieved. Within the thrust chamber 609 the air flowing though that region 619 is heated to a very high temperature. The air is heated by combusting it with injected fuel. The apparatus for this combustion comprises a fuel tank 603, a fuel pump 604, and a fuel injector and combustor 605, downstream of which combustion takes place.

Prior to interacting with the air flows from the spin thrusters there is a forced vortex flow 616 in the vortex chamber 607. The flow from a thruster derives from a return flow 619 of compressed air from the output of the compressor. This compressed air flow passes into the thrust chamber 609 and is heated by fuel combustion downstream of the fuel injector 605. The air is then accelerated through the throat 623 of a nozzle and is further accelerated by an expansion bell 624 until it nearly reaches the maximum velocity allowed by its total temperature. This high speed flow of air 615 from the thruster then mixes with the vortex air 616 in a air mixing region 611. This mixing accelerates the vortex air 616 and produces a combined air flow 612 which is delivered to the diffuser.

It is important to recognize that this embodiment of the thrusters is isomorphic to a subsonic combustion ram jet engine. A ramjet engine of this type comprises three functional parts. At the entrance to the structure of the ramjet engine is a diffuser. This device slows the stream of air entering the engine to near stagnation conditions. The air is compressed and heated by the diffuser. This pressurized air is then mixed with fuel and the combination combusted so as to further heat the air. The much hotter air is then passed through a nozzle which accelerates the air to very high speed—thereby producing substantial thrust.

The thrusters illustrated by FIG. 6 are isomorphically the same, except that the diffuser is remotely located. In this invention the isomorphic diffuser for the thrusters consists of two parts, the fixed diffuser (309 of FIG. 3), which is part of the vortex chamber, and the vortex itself which acts as a centrifugal compressor. Because of the additional centrifugal compression the thrusters in this invention are much more efficient at a lower tangential air flow velocity than the linear air flow velocity of conventional ram jet engines.

For example, a typical ram jet engine must operate near Mach 3 in order to have a pressure ratio above 20:1. Because of the added benefit of centrifugal compression this invention reaches the same pressure ratio, and same operating efficiency, at a vortex tangential flow velocity of about Mach 2.

In a preferred embodiment, represented by FIG. 6, there are two additional air flows which are important. These are a cooling air flow 617, and a temporary high pressure startup air flow 620.

The cooling air flow 617 diverts a portion of the vortex air into a jacket which surrounds the hot air section of the spin thruster. This is the portion which extends from somewhat upstream of the fuel injector to somewhat downstream of the nozzle throat. This cooling air flow provides external cooling of the wall of the spin thruster before it exits the jacket and again merges with the vortex flow. It is also possible to use a small portion of the compressed air return flow 619 to film cool the interior of the hot wall section of the thruster. Since the external cooling air is being heated, through its contact with the hot thruster wall, it is receiving potentially useful enthalpy. This heated air 617 could then be passed out into the vortex flow through its own throat restricted nozzle and thereby be accelerated to supersonic speed. With proper design this cooling flow could form a sheath around the primary thruster exhaust flow. While the cooling flow sheath would not be as fast as the thruster exhaust it nevertheless could enhance the performance of the thruster.

The high pressure startup air flow 620 addresses another very important issue, namely how to start the compressor running. There are at least two ways to start the compressor. The preferred embodiment has an outboard compressor, possibly together with a compressed air storage tank. For aircraft engine startup this outboard compressor could be located on the ground. More likely, the startup compressor would be located on board the vehicle. For a brief interval the startup compressor supplies sufficient high pressure air 620 to light up one, or more, of the spin thrusters and create a high velocity spin thrust. The high speed exhaust from the startup thrusters would sufficiently spin up the vortex and start a gradual autonomous pressure rise. When sufficient autonomous pressure has been achieved the outboard startup compressor can be shut down.

An alternative startup embodiment is not illustrated here. As noted above, a conventional impeller generally is limited to a tip speed of 1600 feet per second, or less. On the other hand, this invention appears capable of creating an analogous "tip" speed substantially greater than 2000 feet per second. This tangential velocity difference suggests that a subscale impeller, centered at the rotation center of the induced vortex, could be used for startup. The idea is to establish such an impeller with a radius sufficient that entering air flow would be trapped by the front wall shroud 401 of FIG. 4. The radius of such an impeller would typically be less than about 60% to 70% of the spin thruster radius. During startup, a motor, such as an electric motor, might temporarily rotate the impeller, thereby creating air compression, until an autonomous thruster driven vortex compression can be established. At this point the drive motor of the impeller is deactivated and the impeller is allowed to free wheel, its spinning now being driven by the thruster induced vortex.

Alternatively, the impeller's connection to an electric drive motor might be reversed so that it becomes an electrical generator which can supply useful electricity. For electric power generation the thruster induced vortex would provide the motive power to keep the impeller spinning. Another embodiment might use this vortex driven small impeller to power the fuel pump. This makes sense because the fuel must be pressurized to at least the vortex stagnation pressure in order to be injected into the combustor of the thruster.

In still another embodiment the fuel pump could be powered by bleed air from the output of the compressor. This bleed air would drive a turbine which would, in turn, drive the fuel pump.

A gas compressor, by itself, has limited utility. It becomes an important device once it supplies energy to a useful work device. Most often this coupling takes the form of a gas turbine engine. This invention posits the same kind of coupling between the new type of gas compressor and various useful work devices. FIGS. 7 through 9 illustrate major embodiments of machines comprising the new type compressor and various useful work devices. These figures are schematic in nature and are intended simply to illustrate how the embodiment works. They are not representative of a real embodiment in form or size or in detail.

FIG. 7 illustrates a sectional side view of an embodiment of a jet engine comprising a new type of air compressor and a thrust producing nozzle. It is a section through the center of an idealized jet engine 700 showing the relative layout of the essential elements of the engine. The elements shown FIG. 7 are not to scale and do not illustrate the physical appearance, or precise arrangement, of the various elements. They are for instructional purposes only and are meant to provide an abstract representation of certain functional elements.

Since this idealized embodiment is that of a jet engine it is assumed that the gas flowing through the engine is ordinary air. In its parts the engine comprises both structural elements and flows of air. It is noteworthy that the flowing air is to be considered, in its various roles, a composition of major functional elements.

The idealized jet engine embodiment 700 comprises a vortex air compressor 701, a plenum 721, and a nozzle 722. The nozzle 722 serves as a useful work device which operates in conjunction with the air compressor 701. Air flows into the system through an air inlet 710. This air merges into a vortex air flow 716. The air then proceeds radially to the air mixing region 712 where it is mixed with the very high speed tangentially exhausting air from one, or more, tangential thrusters 708. The mixed, high speed, flow of air then passes through a diffuser section 713 where it is further pressurized. The pressurized air exiting from the diffuser is collected by a manifold 703. The manifold delivers a compressed air supply 705 out of the vortex section of the air compressor. This air supply is divided with a minor portion of the compressed air 706 being delivered to the tangential thrusters 708.

The main portion of the compressed air supply 705 is delivered to a compressed air collection plenum 721. This plenum acts as an effective thrust chamber for jet propulsion. The air in the plenum is accelerated through a delaval nozzle 722 reaching sonic speed at the throat 723 of the nozzle. Subsequently, the air flow is passed through an optional expansion bell 724 where the flow may be further accelerated to produce a high speed jet exhaust 725. This high speed exhaust flow produces a force on the engine structure which can be used to propel a vehicle such as an aircraft.

Two comments are appropriate. First, the pressure delivered by the compressor is relatively high. Pressures exceeding 350 to 400 pounds per square inch will likely be commonplace. In order to minimize weight all pressurized gas containing components, such as the ducts and the plenum should be the minimum diameter necessary to efficiently do their job. Second, some types of diffuser and manifold combinations inherently act as plenum chambers. The volute diffuser is an example of such a dual use device.

FIG. 8 illustrates a sectional side view of an embodiment of a jet engine. It is a section through the center of an idealized jet engine 800 showing the relative layout of the essential elements of the engine. The elements shown FIG. 8 are not to scale and do not illustrate the physical appearance, or precise arrangement, of the various elements. They are for instructional purposes only and are meant to provide an abstract representation of certain functional elements.

The idealized jet engine embodiment 800 comprises a vortex air compressor 801, a plenum 821, a combustor 825, and a nozzle 822. The combustor 825 is part of a system comprised of the combustor 825, a fuel tank 826, and a fuel pump 827.

The nozzle 822 serves as a useful work device which operates in conjunction with the air compressor 801 and the combustor 828 to provide propulsive thrust.

Air flows into the system through an air inlet 810. This air merges into a vortex air flow 816. The air then proceeds radially to the air mixing region 812 where it is mixed with the very high speed tangentially exhausting air from one, or more, tangential thrusters 808. The mixed, high speed, flow of air then passes through a diffuser section 813 where it is further pressurized. The pressurized air exiting from the diffuser is collected by a manifold 803. The manifold delivers a compressed air supply 805 out of the vortex section of the air compressor. This air supply is divided with a minor portion of the compressed air 806 being delivered to the tangential thrusters 808.

The main portion of the compressed air supply 805 is delivered to a compressed air collection plenum 821. This plenum collects the compressed air and passes it into the combustor 828 where it is further heated. This combustor acts as an afterburner and is a commonly found component of military fighter jet engines. After heating the compressed air the combustor delivers the further heated air to a thrust nozzle 822.

Downstream of the combustor the air is accelerated through a delaval nozzle 822 reaching sonic speed at the throat 823 of the nozzle. Subsequently, the air flow is passed through an optional expansion bell 824 where the flow may be further accelerated to produce a high speed jet exhaust 825. This high speed exhaust flow produces a force on the engine structure which can be used to propel a vehicle such as an aircraft.

FIG. 9 illustrates a sectional side view of an embodiment of a turbine engine. It is a section through the center of an idealized turbine 900 showing the relative layout of the essential elements of the engine. The elements shown FIG. 9 are not to scale and do not illustrate the physical appearance, or precise arrangement, of the various elements. They are for instructional purposes only and are meant to provide an abstract representation of certain functional elements.

The idealized turbine engine embodiment 900 comprises a vortex air compressor 901, a plenum 921, a free turbine 930 and a rotary drive shaft 931 coupled to the free turbine 930. The free turbine and its drive shaft serve as a useful work device to provide rotary power.

Many gas turbine engines—particularly turboshaft engines—have two sets of turbines working in tandem. The upstream turbine is denoted the "high pressure turbine". Its primary function is to rotate the drive shaft which powers its associated air compressor. The second turbine is down stream of the high pressure turbine and works with partially decompressed air. For this reason it is called a "low pressure turbine" or, more often, a "free turbine." It is called a free turbine because it its not mechanically coupled to the compressor section of the engine. The free turbine may typically be used to provide rotary drive to a device such as a propeller or an electric generator.

In this embodiment, air flows into the system through an air inlet 910. This air merges into a vortex air flow 916. The air then proceeds radially to the air mixing region 912 where it is mixed with the very high speed tangentially exhausting air from one, or more, tangential thrusters 908. The mixed, high speed, flow of air then passes through a diffuser section 913 where it is further pressurized. The pressurized air exiting from the diffuser is collected by a manifold 903. The manifold delivers a compressed air supply 905 out of the vortex section of the air compressor. This air supply is divided with a minor portion of the compressed air 906 being delivered to the tangential thrusters 908.

The main portion of the compressed air supply 905 is delivered to a compressed air collection plenum 921. The plenum 921 acts as a transmission device which directs the flow of high pressure air to a free turbine 930. The compressed air powers the turbine and causes it to rotate a drive shaft 931 thereby supplying rotary power to external devices.

It is important to recognize that the power communication from the air compressor to the free turbine does not require a drive shaft between the two. The energy required to drive the free turbine comes from the compressed air and this air can flow in any desired direction. Therefore the free turbine, and its associated output drive shaft, can be positioned in any convenient orientation and location. This flexibility is illustrated by FIG. 9. Embodiments of this kind offer remarkable design flexibility.

Figure 11B:
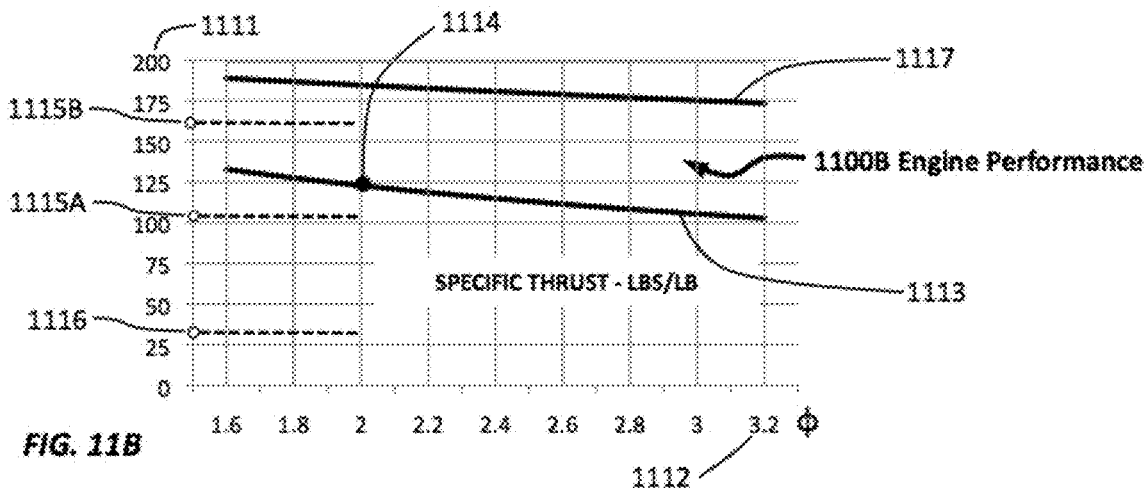
FIG. 11B is a chart of the predicted specific thrust of the embodiment of FIG. 7 with and without afterburning.
Figure 11C:
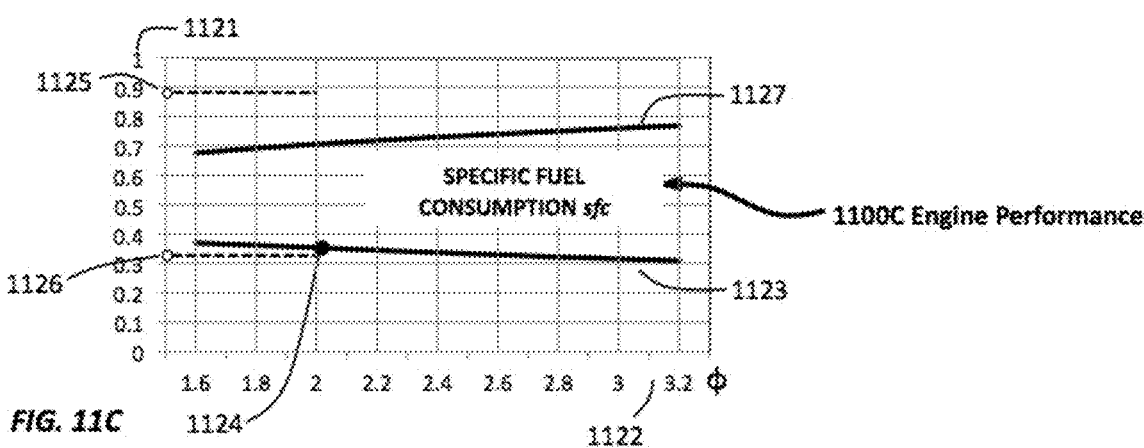
FIG. 11C is a chart of the predicted specific fuel consumption of the embodiment of FIG. 7 with and without afterburning.
Figure 12:
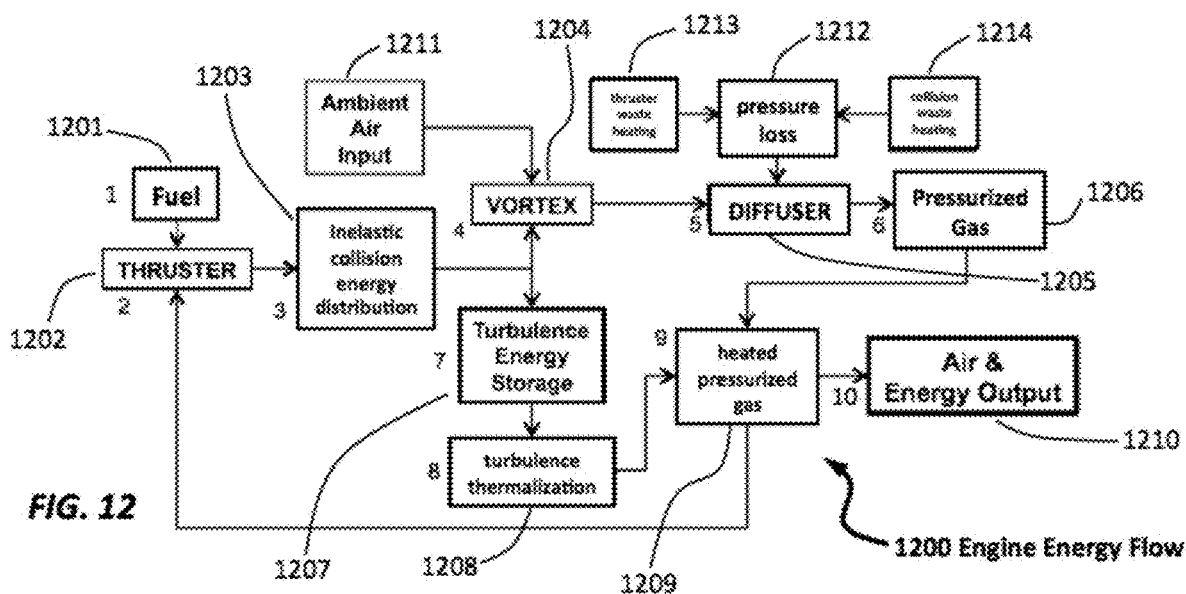
FIG. 12 is a chart of the expected energy flow through the system.

FIGS. 10 through 12 illustrate the performance advantages of the invention for aviation. They represent invention embodiments in the form of aircraft engines.

FIG. 10. Is a sequence diagram which represents a schematic presentation of the pressure levels within two typical gas turbine engines and an embodiment of the invention. This illustration is meant solely to show comparative features and is not intended to accurately portray pressure levels. For the sake of discussion we assume that the gas is ambient air.

FIG. 10 plots representative pressure levels as a function of regional activity within various engines. Represented are a centrifugal compressor engine 1010, an axial flow compressor engine 1008, and an embodiment engine 1009 of the invention.

Proceeding through the various engine activities we start with some air pressure at the air intake 1001. This air passes through a compressor 1002, followed by a combustor 1003. Next, the air passes through the turbine stage 1004. At the turbine stage conventional gas turbine engines are differentiated from the invention engine embodiment. Specifically, the air flowing in a conventional gas turbine engine must pass through a turbine at this stage. Air flowing through an invention embodiment does not encounter a turbine at this stage. Subsequent to the turbine stage the air, for all three engines, flows through a thrusting nozzle 1005 and then, optionally, through an expansion bell 1006. Finally, the air is exhausted to ambient (not shown).

As air flows through the engines its pressure rises and falls. At the air intake 1001, there may be significant pressure rise through the intake because of forward motion of the aircraft. Conversely, when the aircraft is stationary on the ground there is little pressure rise in the intake. This is the pressure condition shown here. The main pressure rise occurs in the compressor stage 1002. For a centrifugal compressor engine 1010 the pressure ratio, compared with the air intake, is typically about 6. For the axial compressor turbine engine 1008 a typical pressure ratio may be 25 or more. For purposes of discussion we assume the axial flow engine has a compressor ratio of 28. We also assume that an invention embodiment engine 1009 has a pressure ratio of 24. These numbers are merely representative of real engines and were specifically picked for this discussion to simplify calculations.

The two conventional gas turbine engines have a separate combustor 1003. The invention embodiment does not since combustion takes place within the various thrusters. There will be a slight pressure loss in the combustor for the conventional engines and also very little for an invention embodiment. We assume that any such losses are negligible.

There is, however, a very large pressure drop through the turbine section 1004 of a conventional gas turbine engine. It is this large pressure drop which distinguishes conventional gas turbine engines from an invention embodiment and is one of the factors which gives the invention embodiment its performance superiority.

It is important to recognize that, in a conventional gas turbine engine, the power needed to compress the air must be delivered by the high pressure turbine. The greater the pressure ratio, the more power must be delivered by the turbine. A low pressure engine, such as one with a single stage centrifugal compressor, can easily be powered by a single turbine stage. A high pressure engine, such as one with an axial flow compressor, may require two, or more, turbine stages. What is significant about the number of turbine stages is that each stage will drop the pressure ratio by about a factor of two. Thus, a single stage turbine has a pressure loss of about 50% whereas a two stage turbine has a pressure loss of about 75%. Without a turbine stage, the invention embodiment engine does not suffer these pressure losses.

Putting some representative numbers to the three engines, the centrifugal compression gas turbine engine, being a low pressure engine, would have a single turbine stage with 50% pressure loss. Its compressor pressure ratio of 6 (compared to ambient input) would be reduced to 3 after the turbine and at the entrance to the nozzle. The axial flow engine has a high pressure ratio and would likely require a two stage turbine. Its initial pressure ratio of 28 would end up at the nozzle entrance being about 7. The invention embodiment would preserve its pressure ratio of 24. Thus, the invention embodiment would have a pressure ratio advantage of about 3.5 over the axial flow engine and 8 over the centrifugal compressor engine.

FIGS. 11A through 11C illustrate some calculated performance estimates for an invention aircraft engine embodiment. These estimates are normalized to a flow rate of one pound (mass) of air per second. These, then, are specific measurements. The spin thruster temperature is assumed to be 3500 degrees Rankine. The system efficiencies are 95% thruster efficiency and 90% diffuser efficiency. The engine has an afterburner. When operating without an afterburner the engine is conventionally called in "dry" operation. When the afterburner is functioning the engine is said to be "wet." The operating condition is "Sea Level Static Thrust" (SLST), which is the conventional standard for comparing most aircraft engines.

The figures show estimated performance characteristics as a function of "flow ratio." Flow ratio is the ratio of the mass flowing completely through the engine divided by the mass flowing through the spin thrusters. Thus, if two pounds per second are flowing into, and out of, the engine and one pound per second is recirculated to flow through the thrusters, the flow ratio would be two. In this example the flow after mixing would be three pounds per second. In another case, three pounds per second flows through the engine and one pound flows through the thrusters. This would give a flow ratio of three, and a mixed flow of four, etc. Note that in the mixing region of the vortex chamber these two mass flows combine so that the mixed flow is always temporarily the sum of the two flows.

In these figures there are notations for existing aircraft engines. There are two existing engines represented. The P&W F135 engine is the F-35 fighter engine. It represents the latest operational U.S. fighter engine technology. The GE 90-115B engine is a high bypass turbofan engine. It is installed on the Boeing 777 200ER (extended range) airliner. It represents the current state of the art in airline engines.

The performance curves shown in FIG. 11 were developed from industry, and academic, standard equations for one dimensional isentropic compressible gas flow. These one dimensional equations are highly non linear. Fortunately, they are algebraic in form so they may be easily calculated with a simple computer program. The equations have a long history of providing quite good first order performance predictions. Since the invention introduces new features it was necessary to slightly alter the sequence of equations by introducing a new one for the pressure ratio estimate. This new equation is conservation of momentum during the mixing of the thruster gas with the vortex gas.

FIG. 11A. This graph 1100A shows the parametric pressure ratio 1101 of a representative embodiment of the invention. Also shown in the figure are the SLST performances of existing gas turbine aircraft engines. The parametric pressure ratio curve 1103 is a function of the flow ratio 1102.

Since the embodiment pressure ratio increases as the flow ratio decreases, a high performance invention embodiment engine would likely operate with a flow ratio near two. Thus, the figure indicates a preferred flow ratio design point 1104 near two. For this set of calculations the design point estimates a pressure ratio of about 23 for a single stage of vortex compression.

Comparison of the operating pressure of the invention embodiment with an existing axial flow gas turbine F135 engine 1105 shows the invention compression to be competitive. When the invention's lack of turbine pressure loss is taken into consideration the invention promises marked superiority over existing engines of this type. This will become evident when FIGS. 11B and 11C are examined.

The high performance GE 90-115B airline engine 1106 has a very much higher pressure ratio than the fighter engines. The airline engine uses a very complex axial flow compressor to develop a pressure ratio of about forty three.

The reason for this higher pressure ratio appears to be the need to drive the large bypass fan of this engine. This fan requires a lot of power. The free turbine, downstream of the high pressure turbine, therefore requires a substantial inlet pressure if it is to supply the fan power. Because of the great pressure loss in the high pressure turbine, the compressor pressure ratio must be very high to make up for the initial turbine pressure loss. The benefit provided by the airline engine is a reduced specific fuel consumption, as will be shown in FIG. 11C.

FIG. 11B. This graph 1100B illustrates parametric relationships 1113 and 1117 of an invention embodiment. Curve 1113 represents an invention embodiment engine operating without afterburning (i.e. dry). Curve 1117 is the same engine with afterburning (wet). These parametric curves show specific thrust 1111 as a function of flow ratio 1112. Also included in the chart are the specific thrusts 1115A (dry) and 1115B (wet) of a high performance F135 fighter engine and a high performance GE 90-115B airline engine 1116.

Specific thrust is defined as the pounds of force produced by the flow of one pound mass of air per second.

The preferred invention embodiment engine would be expected to operate at a flow ratio 1114 near two. With this flow ratio the chart estimates that the specific thrust of the invention embodiment is roughly 25% greater than the F135 high performance engine operating without afterburning 1115A and about 400% greater than the airline engine 1116. When the invention embodiment is afterburning 1117 its specific thrust is increased still further to nearly 200. These performance advantages over the F135 fighter engine is to be expected because of the much higher thrust nozzle pressure ratio and total temperature of the invention embodiment.

The reason for the much lower airliner engine specific thrust is that this engine moves a much larger mass of air at a much lower velocity. Under subsonic flight conditions this design option provides a much higher propulsion efficiency. Theory says that the propulsion efficiency is maximum when the velocity of engine exhaust air exactly matches the forward velocity of the aircraft.

FIG. 11C. This FIG. 1100C plots the specific fuel consumption 1121, of an invention embodiment engine, as a function of flow ratio 1122. Specific fuel consumption (sfc) is the mass of fuel consumed during a specific period for a given amount of thrust. In the example here, this is defined as: pounds of fuel consumed per hour to produce a pound of thrust. Specific fuel consumption is inversely proportional to specific impulse. In general, the lower the sfc the more desirable the engine.

FIG. 11C shows parametrically 1123 and 1127 how sfc varies as a function of flow ratio 1122. Curve 1123 represents sfc without afterburning. Curve 1127 represents sfc with afterburning. The preferred design point of a representative invention engine embodiment 1124 has a flow ratio near 2. This would be characteristic of a fighter plane engine. From the parametric curve we see that the sfc without afterburning has little change over a substantial range of flow ratio. Translating this into a different form, for an engine similar to the invention embodiment, the engine thrust is nearly proportional to fuel consumption.

When the invention embodiment engine is compared with existing gas turbine engines we see that its specific fuel consumption is lower, and therefore better, than that of many existing engines. As expected, the high performance F135 fighter engine 1125 has the highest sfc. FIG. 11C only shows the F135 sfc for the non afterburn case because afterburn data is not currently available. The F135 engine is predicted to have four times the sfc of the invention embodiment. Realistically, any real embodiment of the invention will have losses that reduce this difference somewhat. Still, because of its predicted very low sfc, an engine based on the invention is likely to greatly extend the range of many types of aircraft.

The P&W 90-115B airline engine 1126 has a substantially lower sfc than the conventional fighter engines and therefore has much better fuel economy. In this case an invention embodiment is predicted to have approximately the same sfc as the P&W 90-115B. What this would mean in practice is that the range of fighter aircraft could be extended to be comparable to airline aircraft. The superior economy of the invention engine may be attributable to its higher output pressure ratio.

FIG. 12. is a schematic of the expected flow of energy through the invention.

In energy flow diagram 1200 the energy source is fuel 1201 which is injected into one, or more, fixed thrusters 1202. The fuel can be any combustible gas, liquid or even fluidized nano scale powder. The only major restriction is that combustion of the fuel does not create residues (e.g. coking) which can clog the thruster or its nozzle aperture.

Through combustion of the fuel, after mixing with a supply of compressed air, a very high velocity gas flow jets out from each thruster. This high velocity gas flow collides with the much lower velocity vortex gas flow 1204 and, upon complete mixing, propels the vortex spiral flow. The collision of the two gas streams is inelastic because the two flows of gas mix and merge to become (temporarily) one.

In any inelastic collision, as shown by 1203, the kinetic energy of the merged objects is less than the kinetic energy of the propelling object. The lost energy usually shows up, after some period of time, as heating. In the invention the lost energy of collision temporarily takes the form of turbulence 1207 in the mixed gases. The turbulence energy is the minor portion of the thruster delivered energy. The major portion of the energy is delivered to propel the vortex 1204.

A key issue is how long does it take the lost turbulence energy to convert to heat? Air is a very low viscosity fluid. This means that, above a certain rather low velocity, turbulence will form in flowing air (i.e. when the Reynolds number is large). This is due to the Kelvin-Helmholtz (KH) instability when fluids interact in shear. (As an example, when wind flows over water this KH instability produces waves.) In gas, turbulence takes the form of vortexes or whirls. These vortexes locally have angular momentum and therefore stored kinetic energy. Initially the turbulence vortexes are relatively large and maintain their form for a measurable length of time. However, vortexes are also subject to KH instability and that instability progressively breaks down the whirls into ever smaller ones. Eventually, the turbulence whirls become small enough that viscous forces begin to dominate (low Reynolds number). This is the Kolmogorov transition. After this transition the turbulence is operating at the molecular level and conversion of the turbulence stored energy to heating the gas takes place rapidly—on the order of milliseconds. This turbulence heating is defined, here, as "thermalization."

For most embodiments of the invention, calculations show that gas flows from the entrance to the exit in a very short time—no more than a very few milliseconds, at most. Since the thruster mixing turbulence is produced very close to the diffuser vanes 1205, this turbulence will be swept through the vanes in typically less than a millisecond. It is likely, therefore, that very little of the energy stored in the turbulence will have been converted to heating before, and during, the vane diffusion process. The turbulence thermalization 1208 therefore must, for the most part, take place after the gas has been compressed. This means that the turbulence scavenges the otherwise waste heat from the inelastic collision and converts it into useful heating 1209 of the pressurized gas.

This turbulence energy storage and subsequent release takes place entirely within the mixed gas flow a substantial time after the thruster gas has merged with the vortex gas. Thus, the turbulence flows completely through the pressurizing diffuser vanes in exactly the same way as the general gas flow (indeed, the two are mixed together). There is evidence for this. Several (proprietary) Computer Fluid Dynamic (CFD) simulations of high speed centrifugal gas compressors clearly show the turbulence passing through vaned diffusers without visible decay. One such (proprietary) simulation even shows the beginning of the turbulence collapse into the post diffuser thermalization.

Continuing with the energy flow diagram, ambient air 1211 is ingested into the apparatus and merges with the already existing vortex 1204. Through centrifugal force the air is substantially compressed. This air passes through a diffuser 1205 where it is slowed and further compressed. After the diffuser the air pressure has reached its maximum value.

However, there also are system losses. These mainly affect the deliverable pressure ratio. Pressure loss 1212 is mostly attributable to heating of the air before it flows into the diffuser. There are two major sources of undesired heating. The first is that not all the thruster gas energy is conveyed to the vortex as momentum transfer. This shows up as undesirable waste heat 1213. The second is instantaneous heating 1214 from the collision of the thruster gas with the vortex gas.

The gas flowing out of the diffuser has been slowed, pressurized 1206, and heated as a result of the pressurization. This gas receives further heating from the thermalization decay 1208 of the collision produced turbulence 1207. The minor part of this doubly heated pressurized gas 1209 is then conveyed to the thrusters 1202 where it is further heated by fuel combustion and ejected as a high speed thrusting flow. The major part of the gas flow 1209 is conveyed 1210 out of the compressor where it may be used to perform useful work. Such useful work might be acceleration of the pressurized air through a nozzle to produce thrust. Or, for example, the air might be passed through a free turbine to produce rotary power.

Additional Theoretical Treatment

The following is a partial model describing the invention. The full theory examines several additional factors, such as the static temperature cooling in the vortex. The full theory's rather complex cooling equation is quantitatively verified by the behavior of a Hilsch Tube, as mentioned below.

This invention depends on the Euler Whirl Equation (EWE) for its high performance. The EWE tells us that for a full forced vortex, the enthalpy rise is twice what would be expected by bringing a mass of linearly flowing high velocity gas to a halt. It should be noted that this doubled enthalpy is not true for an annular vortex, or ring of tangentially circulating gas. In other words, for a full forced vortex, the total enthalpy rise is twice that provided by the usual stagnation enthalpy. One form of the EWE equation is the modified increase in enthalpy, $\Delta h$:

$$\Delta h = \frac{1}{2g} V_2^2 + \frac{1}{2g}(V_2^2 - V_1^2) \tag{1}$$

Where $V_2$ is the tangential velocity at the outer radius of the forced vortex and $V_1$ is the tangential velocity at the inner radius of an annular forced vortex. The inner radius is the location for gas entry.

Equation 1 provides the kinetic enthalpy rise of the gas in a forced vortex at the outer edge of the forced vortex (the temperature contribution to enthalpy is handled separately). The first term on the right, dependent on $V_2$, is the linear kinetic energy of the mass of gas at the outer edge radius of $r_2$. The term dependent on $V_2^2 - V_1^2$ is the result of a pressure rise due to the centrifugal force acting on gas within a vortex annular ring extending from radius $r_1$ to radius $r_2$. This is the case where the gas is flowing radially outwards from a source at radius $r_1$. Note that each term has the standard ½ coefficient of kinetic energy. Note also that for a thin annular vortex, where $V_2$ and $V_1$ are nearly the same, the second term on the right is small and the kinetic enthalpy resembles that of a mass of gas moving linearly at velocity $V_2$. An axial flow embodiment of this invention will generate an annular vortex so that $r_1$ is only slightly less than $r_2$. Thus, in an axial flow engine the second term on the right will be small and the enthalpy change will not be as large as for the centrifugal compressor embodiment. Consequently, the pressure ratio in an axial flow embodiment will be substantially less than the pressure ratio in a centrifugal compressor embodiment. This is the reason than an axial flow embodiment does not look promising.

For a full forced vortex, such as the invention's forced vortex with a central source, the condition is: $V_1=0$. In this case the kinetic energy and centrifugal compression contributions to the Euler Whirl Equation will be equal. The total enthalpy at the edge of the vortex will therefore be twice what would be expected from simply moving the gas along at some velocity $V_2$. This is the case for a full forced vortex extending all the way to the center of rotation. The resulting EWE is then the form employed in the theoretical treatment of this invention:

$$\Delta h = \frac{V^2}{g} \tag{2}$$

The stagnation pressure rise is an exponential function of the total enthalpy, including the temperature enthalpy of the entering air. The exponent in the pressure equation is large—typically about 3.5. Therefore, doubling the kinetic portion of the total enthalpy will lead to a very substantial increase in total pressure compared to linear motion stagnation.

Most textbooks quote the most general form of the EWE (similar to equation 1) but do not derive it. Thus, this equation may be misused in the way that it is applied to axial flow, or annular vortex, engines. To get the full benefit from equation 1 we need a full vortex which extends from the center of rotation to the edge. In this case the pressure rise is referenced to the pressure at the rotation center of a full gas vortex. As with this invention, impeller driven conventional centrifugal compressor engines create a full forced vortex. In these engines the central reference pressure is that of the stagnation pressure of the ambient air entering the engine through a central inlet. With this substantial central pressure, centrifugal compression engines have the benefit of a full forced vortex. Equation 2 therefore applies to these engines.

For incompressible flow the EWE is easily derived using Bernoulli's Equation with a simple radial integration. For compressible flow it is also possible to derive the EWE but the derivation is substantially more complicated in that it involves an exponential integral. This integral is:

$$\int_{p1}^{p2} \frac{dp}{p^{1/\gamma}} = a \int_{r1}^{r2} r dr \quad (3)$$

where, $$a = \frac{\rho_1}{\rho_1^{1/\gamma}} \omega^2 \quad (4)$$

The integral on the left in equation 3 describes the pressure rise as the radius increases from $r_1$ to $r_2$. It ends up being a pressure ratio. The integral on the right describes a scaled annular area over this same radius range. The density, $\rho_1$, is the gas density at the entrance to the system. $p_1$ is the entrance pressure and $\omega$ is the angular velocity of the forced vortex. The maximum pressure rise occurs when $r_1=0$. Note also, that the pressure ratio depends strongly on the angular velocity $\omega$ and also on the size of the vortex radius, $r_2$. In other words, for a given angular velocity, the larger the radius the larger will be the maximum tangential velocity and the greater will be the enthalpy and pressure ratio.

There are two different models for the compressible gas flow through the invention's compressor. The more detailed model traces the gas flow from a central entrance port acting as a source. This gas flows tangentially and radially through the fast rotating forced vortex. At a point just inside the radius of interaction with the array of thrusters the enthalpy and pressure rise is computed.

Next, the partially pressurized gas is mixed with the much higher velocity jet stream from the pinwheel array of thrusters. Momentum balance and calorimetric balance is maintained in this interaction. The mixed gas then is then diffused and brought to stagnation. The total system pressure rise and temperature rise is computed.

The second model, which we discuss here, is much simpler. The forced vortex is assumed to be a unified construct with the thruster gas already fully mixed in. This vortex is driven by the high velocity gas from the thrusters. Again, momentum balance and calorimetric balance is maintained in the gas mixing region. Only after the gas is diffused to stagnation is the overall pressure and temperature rise computed. The computation is simplified with this model, but both models give the essentially same numerical answers. Because the answers are essentially the same, these two models cross check each other for validity.

The compression process involves positive feedback. Therefore, analysis can begin anywhere in the feedback loop. Here is a sample calculation:

We start with the gas flow through the thrusters. Hot gas flowing through a nozzle into a vacuum has a fully expanded velocity given by:

$$V_s = e\sqrt{2gC_{hot}T_s} \quad (5)$$

All units are English. $T_s$ (° R) is the total gas temperature upstream of the nozzle. $C_{hot}$ is the hot gas heat capacity (214.6 ftlbf/lb° R). g (32.2 ft/sec$^2$) is the acceleration of gravity. $V_s$ (ft/sec) is the fully expanded vacuum velocity of the gas stream coming out of the nozzle. Here e=0.95 is the nozzle efficiency (always less than, but nearly, unity).

Note that the total temperature, $T_s$, includes the enthalpy contribution from the gas pressure. We choose $T_s=3500°$ R. The vacuum velocity of the thruster exhaust is then 6954.9 ft/sec. Derating this velocity by e=0.95, we get a practical velocity $V_s=6607.2$ (ft/sec).

After this gas stream fully mixes with the vortex flow we can compute the vortex velocity after the mixing process. This combined tangential vortex velocity, $V_2$, is determined by momentum balance:

$$V_2 = \frac{V_s}{\varphi + 1} \quad (6)$$

$\varphi=2$ is the flow ratio. $V_2$ therefore is 2202.4 ft/sec. As explained above, the flow ratio is the ratio of mass flowing entirely through the system to mass flowing through the thrusters. After mixing the mass flow is, temporarily, the sum of the two mass flows.

From the EWE, the enthalpy relationship provides a vortex dynamic temperature. We use the cold heat capacity, $C_{cold}=186.75$ ftlbf/lb° R, for this calculation. The temperature equivalent to the dynamic enthalpy has the equation:

$$T_c = \frac{V_2^2}{gC_{cold}} \quad (7)$$

This equation produces a dynamic temperature of $T_c=806.6°$ R.

The total temperature is the dynamic temperature plus the ambient temperature, $T_0$, outside the compressor.

$$T_v = \frac{V_2^2}{gC_{cold}} + T_0 \quad (8)$$

For Sea Level Static Thrust (SLST) operating conditions, $T_0=518.7°$ R. SLST is the industry standard for comparing various jet engines. Adding the dynamic temperature $T_c$ to $T_0$ we get $T_v=1325.3°$ R. This is the total temperature of the vortex after mixing with the thruster gas flow.

We now can compute the stagnation temperature ratio before diffusion (i.e. the vortex total temperature ratio), $T_{vratio}$. This will give us the pressure ratio, $P_{ratio}$, from gas entry to the compressor exit region downstream of the diffuser, This calculation of the pressure ratio depends on the temperature ratio:

$$T_{vratio} = \frac{T_v}{T_o} \quad (9)$$

$T_{vratio}=1325.3/518.7=2.56$. This temperature ratio is then inserted into the compressive gas pressure equation. It leads to the pressure ratio:

$$P_{ratio} = \eta(T_{vratio})^{\gamma/(\gamma-1)} \quad (10)$$

$P_{ratio}=24.2$, where n=0.9 is the efficiency of the diffuser and $\gamma=1.4$ is the ratio of heat capacities. This pressure ratio defines the increase in pressure between the gas inlet to the system and the compressor output duct. It also defines the pressure of the gas flowing into the thrusters. Note that this resulting pressure is substantially higher than the static pressure of the vortex at the mixing region. Note also that for a lower ambient temperature $T_o$, the pressure ratio will be even higher than 24.2:1. In high altitude operation, with its low atmospheric temperature, the single stage compressor can reach pressure ratios as high as 45:1.

Because there is some efficiency loss in the diffuser, the total temperature (i.e. stagnation temperature) after the diffuser is:

$$TT_x = T_o(P_{ratio})^{(\gamma-1)/\gamma} \qquad (11)$$

For this calculation $TT_x = 1289.1°$ R. The total temperature tells us the condition of the compressed gas delivered to the spin thrusters and to any useful work device. In the case of the thrusters, heating within the thrusters raises the gas temperature to $T_s$. This temperature is substantially higher than $TT_x$. The increased thruster temperature is typically achieved by burning fuel in the thrusters. The temperature increase to 3500° R from fuel burning is, in this example, 2210.9° R.

In an alternative system the temperature increase may be achieved by other means, such as focused sunlight.

Turbulence Stored Energy Enhancement

A first order calculation provides an estimate of the benefit of turbulence storage of what otherwise would be wasted energy from the inelastic collision of the gases. To begin we need a rough estimate of the partition of collision energy between the vortex and the turbulence. This is done by taking the per-unit-mass ratio of the vortex kinetic energy and the total kinetic energy of the thruster jet flow. For simplicity we assume that the thruster flow velocity is 6600 feet per second and the vortex "tip" velocity is 2200 feet per second:

$$\text{kinetic energy density ratio} = \frac{3 \times k \times 2200^2}{k \times 6600^2 / 2} = \frac{2}{3} \qquad (12)$$

So roughly ⅔'s of the thruster energy is used to propel the vortex and ⅓ is left over to either be harmful or useful. As explained above, it appears that the ⅓ surplus will prove to be mostly useful.

The turbulence temperature gain is:

$$\text{turbulence temperature gain} = \frac{1}{(2+1)} \times \frac{1}{3} \times \frac{6607^2}{2 \times 32.2 \times 214.6} = 351° R \qquad (13)$$

From equation (11) we have a calculated value of 1289.1° R for the total temperature, with losses, coming out of the diffuser. This temperature represents the energy stored by pressurizing the gas as well as the energy in the ingested ambient air. Adding the post diffuser turbulence induced temperature rise of 351 to this value we get a total thermalized temperature of 1640.1° R. This is the temperature of the gas being injected into the thrusters before combustion and also the temperature of the gas exiting from the compressor.

In order to calculate the thrust gain from the turbulence thermalization, we need an equation which describes the velocity (feet per second) exiting from the main nozzle of a jet engine:

$$V_e = \sqrt{2 \times g \times C_{hot} \times (T_{total} - T_{ambient})} \qquad (14)$$

Without post diffuser turbulence heating the total temperature would be 1289.1° R, as noted before. With turbulence thermalization we have calculated the increased total temperature as 1640.1° R. The thrust gain is the ratio of the exit velocities. The standard measure for engines is "sea level static thrust" (SLST). The standard SLST temperature is 518.7° R. In taking this ratio common terms from equation (14) cancel out. The result is:

$$\text{relative thrust gain} = \sqrt{\frac{1640.1 - 518.7}{1289.1 - 518.7}} = 1.207 \qquad (15)$$

Burning fuel in the thrusters raises the temperature of the incoming air to some desired temperature—in this case 3500° R. The fuel combustion must supply the temperature difference: 3500−1640=1860° R. Without the contribution from the turbulence thermalization the fuel must raise the temperature by 3500−1289.1=2210.9° R. With turbulence thermalization the fuel burn is reduced by a factor of 1860/2210.9=0.841.

Turbulence therefore can be a double friend. It stores what otherwise would be harmful heating energy if the energy were to be released before the diffuser compression (this results in pressure loss). Instead, the turbulence releases its energy after compression where it acts to scavenge and recycle this energy. With this delayed energy release we may obtain more than a 25% gain in thrust together with a substantial reduction in fuel consumption—all while not losing any of the pressure gain.

Hilsch Tube

There exists a device which provides experimental evidence that the vortex compressor portion of the invention will work according to the supporting theoretical calculations. This device is called a "hilsch tube" (references 7 and 8). A hilsch tube is a device for creating separate flows of hot and cold gas from a single source of ambient temperature, pressurized gas. It is primarily used in the chemical processing industry. High pressure gas flows into the hilsch tube in such a way as to create a high velocity full forced vortex inside. When in operation, cold gas flows out through a central hole at one end of the tube and hot gas flows out through a peripheral aperture at the other end.

Even after several decades of research there is no settled explanation for this phenomenon. Its significance for this invention is that the full theory developed to describe the invention finally offers a clear explanation for how the hilsch tube works. The fact that the hilsch tube can now be explained by this theory gives evidence that the invention's full vortex gas compressor will also behave according to the predictions of the same theory.

Additional Applications and Embodiments

Of equal interest are the large variety of configurations and applications possible with this invention. As the foregoing figures illustrate, the invention, in many of its embodiments, is simply a hollow structure comprised of a vortex chamber and various ducts of different shapes coupled with combustion devices. As such, when embodied as a jet engine, the resulting thrust to weight ratio of such an engine will likely be extremely high.

Even the most modern jet engines have a relatively low thrust to weight ratio. For example, the F135 engine on the F35 fighter has thrust to weight ratios of about 7.5:1 (dry) and 11.5:1 (wet/afterburning). Contrast this with liquid propellant rocket engines which have thrust to weight ratios in the range of 40:1 up to 100:1. But even these rocket engines have dense and heavy fuel pumps which limit the thrust to weight ratios of these engines. Because of their entirely hollow structures, invention embodiment engines might have thrust to weight ratios substantially exceeding even rocket engines. This portends great promise for future air vehicle design, particularly vertical take-off and landing designs.

The hollow structure of embodiment engines gives the designer great flexibility in shaping the engine. For example, a simple jet engine might have the shape of a thick disk. The volume of compressed air has a non linear relationship with the pressure of the air. For a pressure ratio of 25, and a flow ratio of 2, the volume of air at the diffuser reduces to about 15% of its original volume. Thus, for a vortex compressor the separation between the front wall and the back wall of the vortex chamber could diminish by about a factor of 6.7 between the entrance and the collection manifold. This thinning of the structure width allows room for the ducts which carry the compressed air to the spin thrusters. The overall envelope thickness of the structure could therefore be roughly constant as a function of the radius.

FIGS. 4A and B and FIGS. 7, 8 and 9 show gas ingestion through a central aperture in the front wall. Because there is no impeller, the entrance aperture could be in the back wall instead of the illustrated front wall. Alternatively, there could be entrances in both the front and back wall. This latter two aperture case has the advantage that, for a given aperture size, twice as much gas can be ingested and therefore the compressor diameter can be reduced for a given amount of gas flow. However, now there must be two intake ducts to feed gas into the compressor.

Conventional gas turbine engines typically have a long axis that is the consequence of the constraint offered by the turbine to compressor drive shaft, and the components attached to this drive shaft. This is invariably the case with axial flow engines. Centrifugal flow engines are more compact and have more flexibility in their structural arrangements. Nevertheless, both types of engines are significantly inhibited in how they may be placed in a vehicle. The design of the vehicle with a conventional gas turbine engine is therefore constrained by the shape of the engines. An engine which is an embodiment of the invention does not have a drive shaft and will be physically more compact. Such an embodiment therefore provides much more flexibility in how it may be installed in an aircraft, or other vehicle.

As an example of this new flexibility, instead of the usual face-on orientation of an aircraft engine, where the vortex would be perpendicular to the flight direction, the engine might be rotated 90 degrees so that it is oriented edge-on. An air intake duct could make a right angle turn to supply the vortex chamber. This configuration lends itself nicely to having intake apertures in both the front and back walls. A more compact engine results. The duct collecting the air from the diffuser section would convey the air to a thrust nozzle for propulsion. The whole arrangement would have a significantly reduced frontal cross-sectional area compared to a conventional engine of similar thrust.

In another example, because embodiment engines of the invention communicate almost entirely with gas flows, modules of these engines could be linked together with appropriate ducting. Thus, various modules could be fed with a common air intake duct. In turn, each module could feed its compressed air output to a common exhaust duct. The exhaust duct could then proceed to a main thrust nozzle. Such an engine would be modular and redundant. The ensemble of modules would exhibit graceful degradation if one, or more modules were to fail. These damaged modules could be valved off so as to not affect the operation of companion functioning modules. The benefits for aircraft propulsion are evident.

For startup of a modular engine embodiment, one module could be started with an external compressor. This startup module could then feed compressed air successively to the other modules of the ensemble, starting each in turn.

Without conventional rotating compressor components there would be no vane stalls and surges in invention embodiments. Operation of invention embodiment engines would therefore be safer than conventional engines over a larger range of operating conditions.

In another embodiment, a core compressor could supply pressurized air to the thrusters of a secondary vortex compressor device thereby creating a tandem compound engine. The secondary vortex device is similar to the core compressor except that it does not have regenerative air flow to its thrusters. Instead, the secondary's thruster air uses only the pressurized air outflow from the core compressor to propel the secondary's vortex. This results in the secondary compressor having significantly larger flow rate than the primary, or core compressor. Operating in this fashion the secondary vortex device is a kind of vortex driven ejector. The secondary device thereby increases the total thrust of the system by delivering an increased amount of air at a lower velocity. The air flowing out of this secondary device and into a thrusting nozzle would be the sum of the air from the core compressor and the air directly ingested by the secondary vortex compressor. The secondary vortex compression device is analogous to the large fan of a conventional turbofan engine.

By closing off the inflow of ambient air into the secondary vortex device the pressure in the secondary will quickly rise to the exit pressure of the primary compressor. This means that an afterburner can be placed ahead of the secondary's nozzle and the combination will act as if it were just the core engine operating in afterburn. In addition, by varying the amount of ambient air inflow into the secondary a variable thrust engine results. Calculations suggest that this compound vortex system would have, for subsonic flight, increased thrust, increased propulsive efficiency and nearly a factor of two improvement in specific fuel consumption when compared with the core embodiment engine. Its specific fuel consumption would therefore be better than the best current turbofan engines in passenger airline service. And yet, through variable valving of the secondary's ambient air inlet, the engine can almost instantly be converted to a high performance engine for supersonic flight.

The invention also has automotive applications. Compared to previous attempts at applying gas turbine engines to automobiles, the invention has numerous advantages. Conventional automotive gas turbine engines employ a "recuperator," which is a kind of heat exchanger, to scavenge as much energy from the turbine exhaust as possible. This exhaust gas is used to preheat the air flowing into the combustor. This is useful because the air, in a conventional gas turbine engine, is typically hotter coming out of the turbine than out of the compressor. By way of contrast, an automotive embodiment of the invention would not use a recuperator. The invention might use a free turbine to rotate a drive shaft that supplies power to the vehicle's wheels. Such an embodiment would not employ a recuperator because the air exhaust from a free turbine will actually be much cooler than the output from the invention's compressor stage. Without a recuperator, considerable weight and expense is saved.

In addition to the increased efficiency which results from the invention's much higher effective pressure ratios, an automotive engine embodiment of the invention has the torque advantage present in all gas turbine engines. That is, unlike an internal combustion engine, a gas turbine engine produces its maximum torque at zero shaft rotational velocity. Another benefit would be the much longer service life resulting from an embodiment's simplicity and lack of many moving parts.

The invention could also provide a more compact, high power, and lighter weight engine to drive an electric generator for hybrid automobiles.

One skilled in the art will realize the invention may be embodied in other specific forms without departing from the spirit or essential characteristics thereof. The foregoing examples are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

I claim as my invention:

1. A centrifugal gas compressor comprising:
   (a) a manifold, which
      i. comprises a front wall, a back wall, and a gas collection manifold wall; and
      ii. is symmetric about an axis;
   (b) a gas inlet aperture, which is located in the front wall at or near the axis;
   (c) at least one jet thruster, wherein the at least one jet thruster:
      i. is stationary with respect to the front wall;
      ii. is situated on a rear surface of the back wall:
      iii. is located in a ring, wherein the ring:
         A. lies in a plane which is perpendicular to the axis; and
         B. has a center which is located on or near the axis;
      iv. comprises a gas exhaust of the at least one jet thruster which is oriented circumferentially to the ring; and
      v. comprises a fuel injector and a combustor, a thrust chamber, and a nozzle;
   (d) at least one gas mixing region, which is constructed to receive and fully combine together:
      i. higher speed gas exhaust from the at least one jet thruster, with
      ii. lower speed radially and circumferentially flowing vortex gas from the gas inlet aperture, forming a combined gas;
   (e) at least one diffuser, which is constructed to receive and pressurize the combined gas from the at least one gas mixing region to form a pressurized gas and deliver the pressurized gas to a gas collection manifold region which is bounded by the gas collection manifold wall;
   (f) at least one gas outlet duct, which is constructed to receive the pressurized gas from the gas collection manifold region; and
   (g) a gas recirculation duct for the at least one jet thruster; the gas recirculation duct being constructed to:
      i. receive a portion of the pressurized gas from the at least one gas outlet duct or the gas collection manifold region; and
      ii. recirculate the portion of the pressurized gas to the at least one jet thruster; and
   (h) useful work device situated to receive the pressurized gas from the at least one gas outlet duct.

2. The centrifugal gas compressor according to claim 1, wherein the at least one jet thruster comprises a plurality of the at least one jet thruster, with a respective gas exhaust of each of the plurality of the at least one jet thruster flowing in the same rotational direction about the axis:
   wherein the gas recirculation duct comprises a plurality of the gas recirculation duct: each of the plurality of the at least one Jet thruster having a single respective gas recirculation duct of the plurality of the gas recirculation duct.

3. The centrifugal gas compressor according to claim 1, wherein the useful work device comprises a thrust producing nozzle.

4. The centrifugal gas compressor according to claim 3, wherein the useful work device further comprises an afterburner.

5. The centrifugal gas compressor according to claim 1, wherein the useful work device comprises a free turbine.

* * * * *